United States Patent
Zhao et al.

(10) Patent No.: US 10,917,931 B2
(45) Date of Patent: Feb. 9, 2021

(54) CELL SELECTION MANAGEMENT FOR END DEVICE IN FEMTOCELL COVERAGE AREA

(71) Applicant: Verizon Patent and Licensing Inc., Arlington, VA (US)

(72) Inventors: Hui Zhao, Marlboro, NJ (US); Andrew E. Youtz, Princeton, NJ (US); Xin Wang, Morris Plains, NJ (US); Samirkumar Patel, Middlesex, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 121 days.

(21) Appl. No.: 16/176,811

(22) Filed: Oct. 31, 2018

(65) Prior Publication Data

US 2020/0137816 A1 Apr. 30, 2020

(51) Int. Cl.
*H04W 76/15* (2018.01)
*H04W 76/11* (2018.01)
*H04W 76/27* (2018.01)
*H04W 48/16* (2009.01)
*H04W 36/00* (2009.01)
*H04W 48/20* (2009.01)
*H04W 84/04* (2009.01)

(52) U.S. Cl.
CPC ....... *H04W 76/15* (2018.02); *H04W 36/0027* (2013.01); *H04W 48/16* (2013.01); *H04W 48/20* (2013.01); *H04W 76/11* (2018.02); *H04W 76/27* (2018.02); *H04W 84/045* (2013.01)

(58) Field of Classification Search
None
See application file for complete search history.

(56) References Cited

U.S. PATENT DOCUMENTS

| | | | | |
|---|---|---|---|---|
| 2011/0263239 | A1* | 10/2011 | Yamagishi | H04W 48/18 455/418 |
| 2014/0376439 | A1* | 12/2014 | Yi | H04L 12/189 370/312 |
| 2020/0077325 | A1* | 3/2020 | Jangid | H04W 48/20 |

* cited by examiner

*Primary Examiner* — Adnan Baig

(57) ABSTRACT

A method, a device, and a non-transitory storage medium are described in which cell selection management service is provided. An Evolved Universal Terrestrial Radio Access-New Radio (E-UTRA-NR) Dual Connectivity (EN-DC) capable end device uses a system information block message to determine whether a wireless station is an EN-DC capable anchor device. Also, the EN-DC capable end device may store a permanent tracking area forbidden list that includes tracking area identifiers pertaining to non-EN-DC capable anchor devices that include femtocell devices.

20 Claims, 26 Drawing Sheets

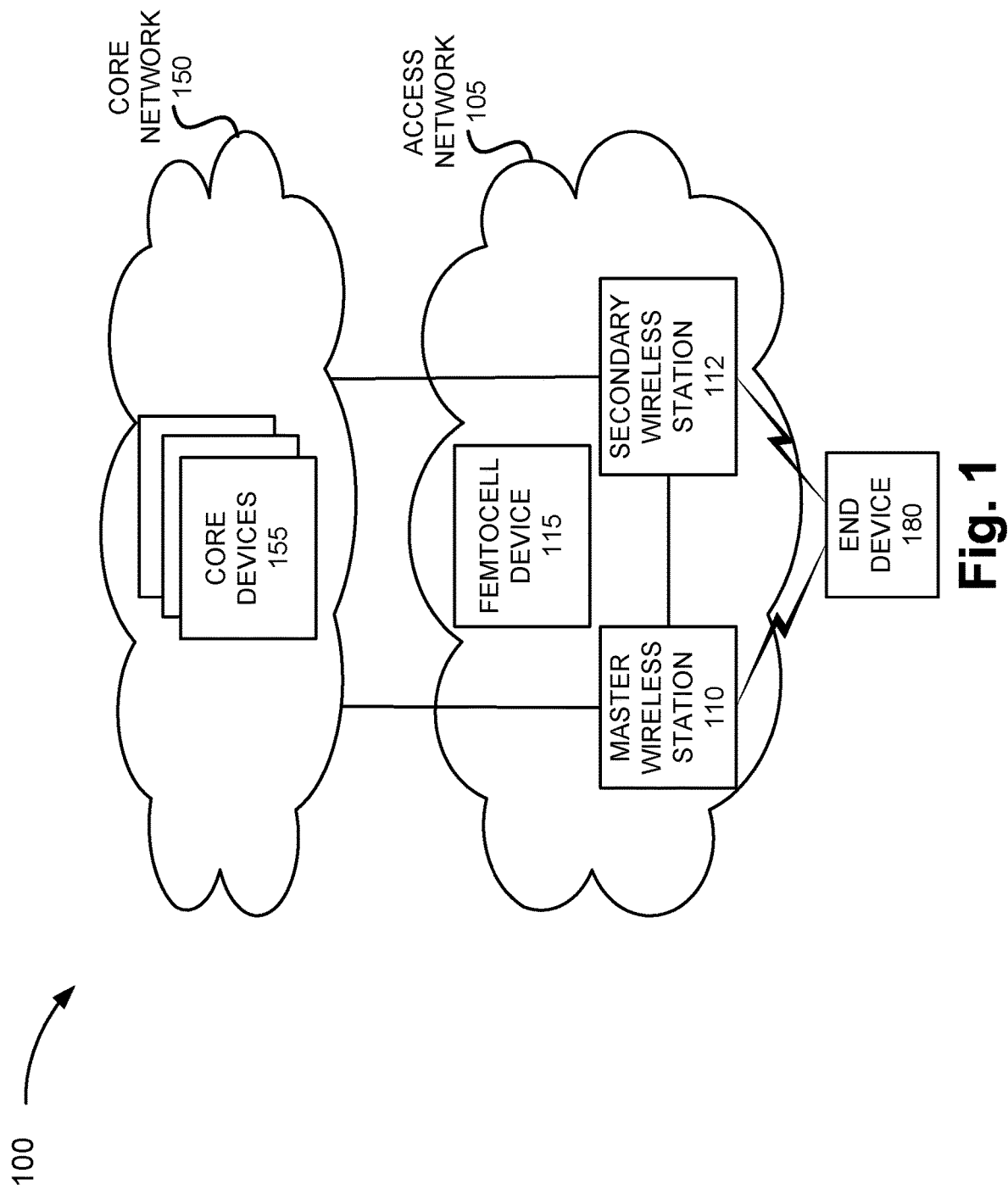

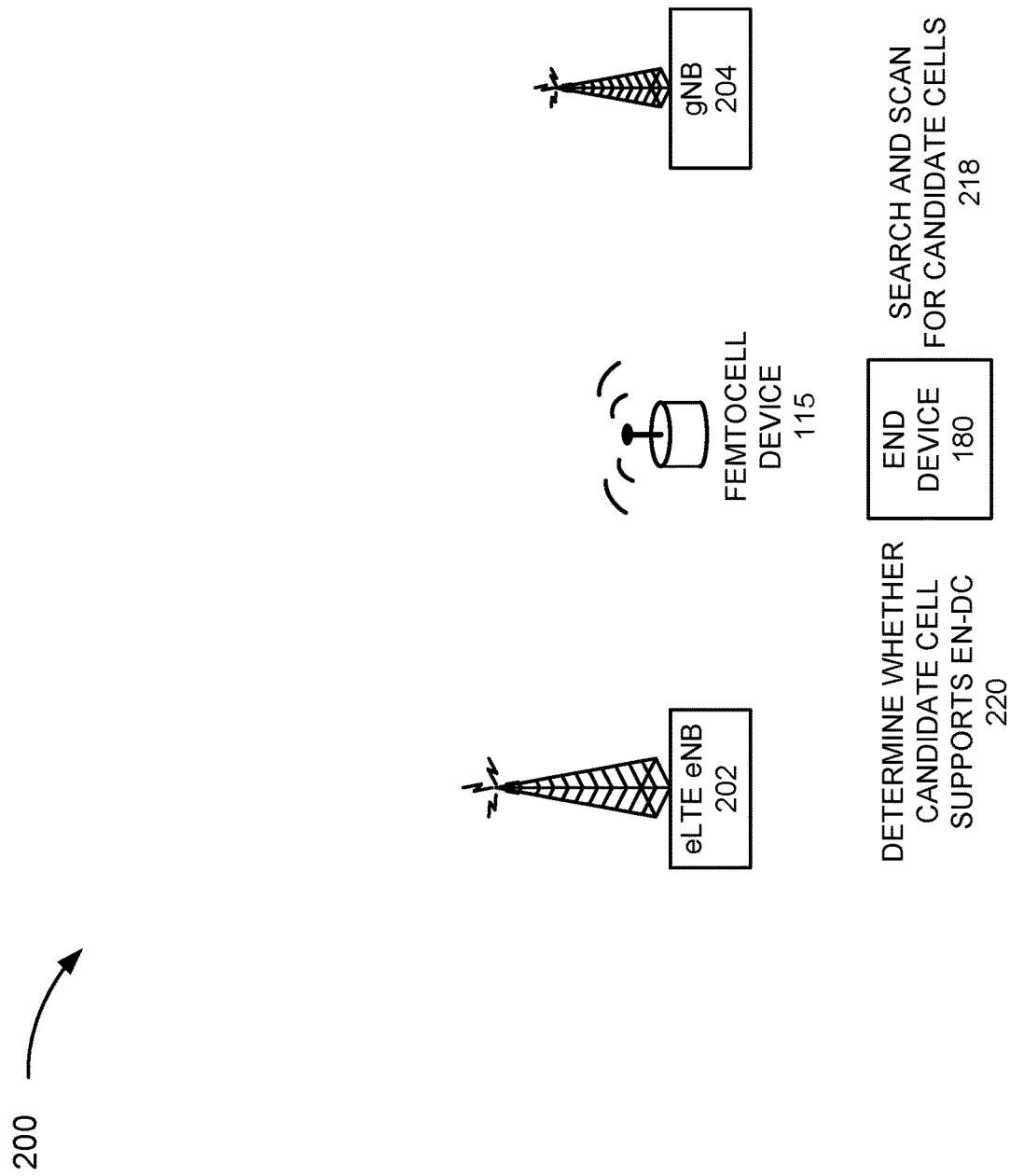

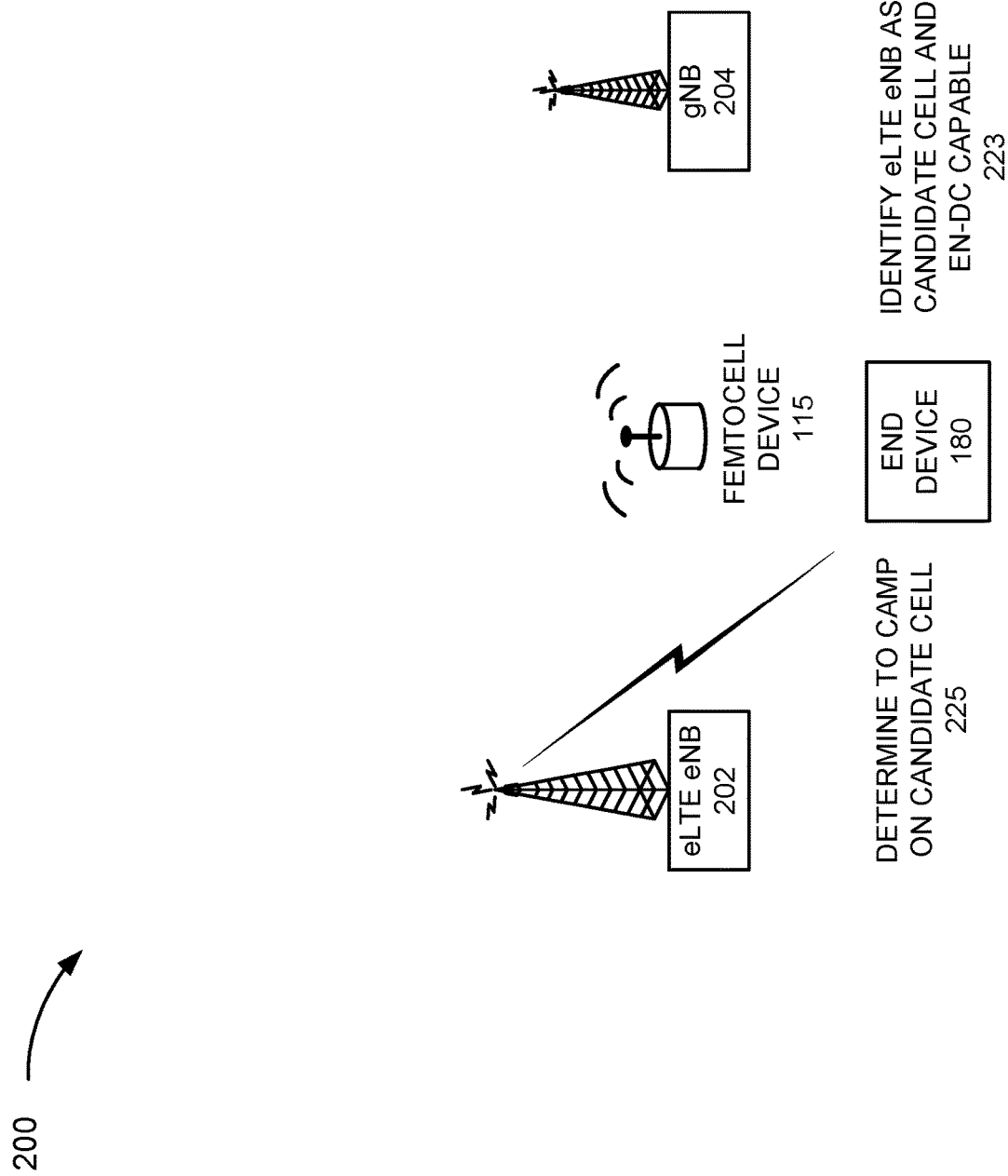

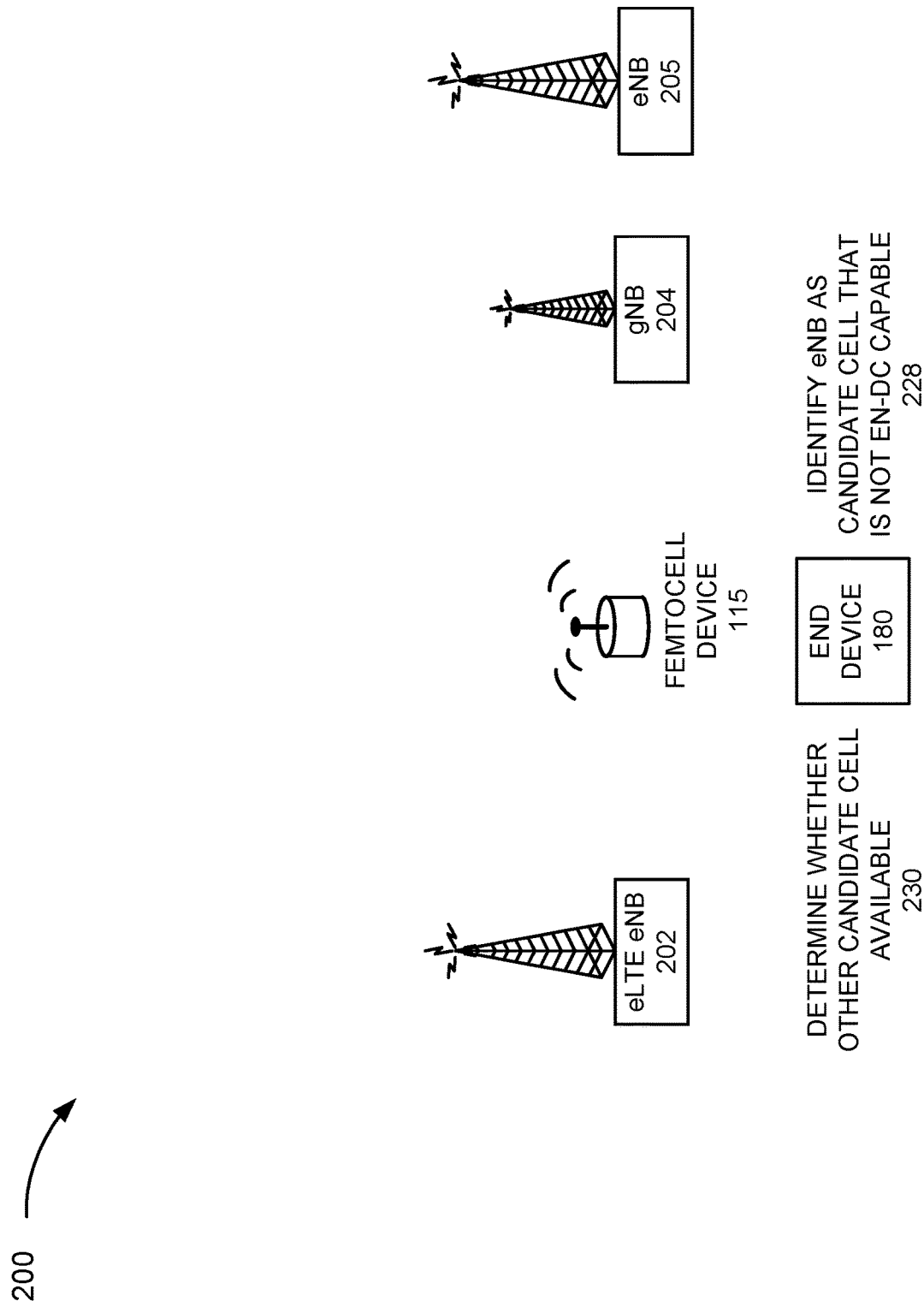

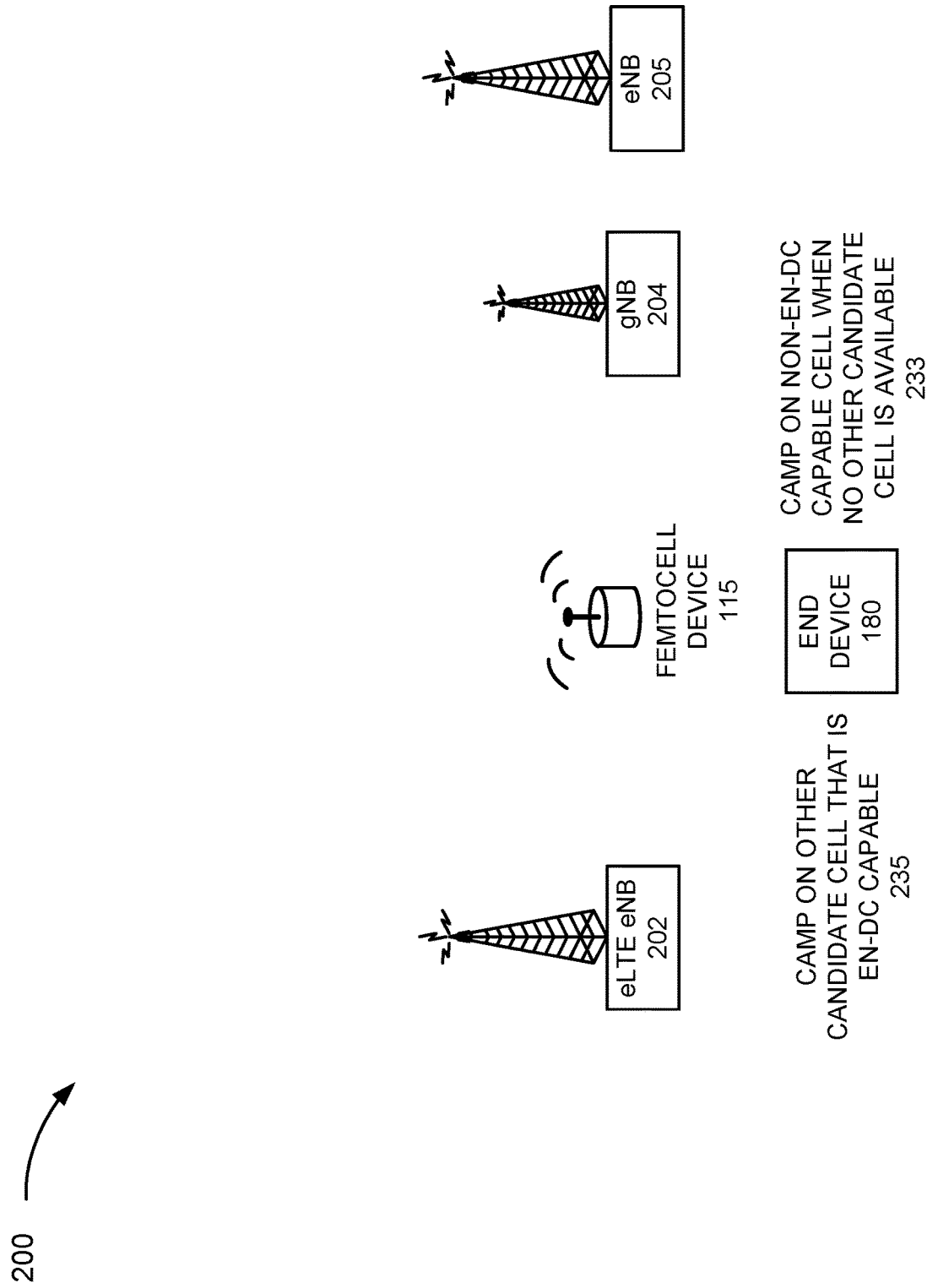

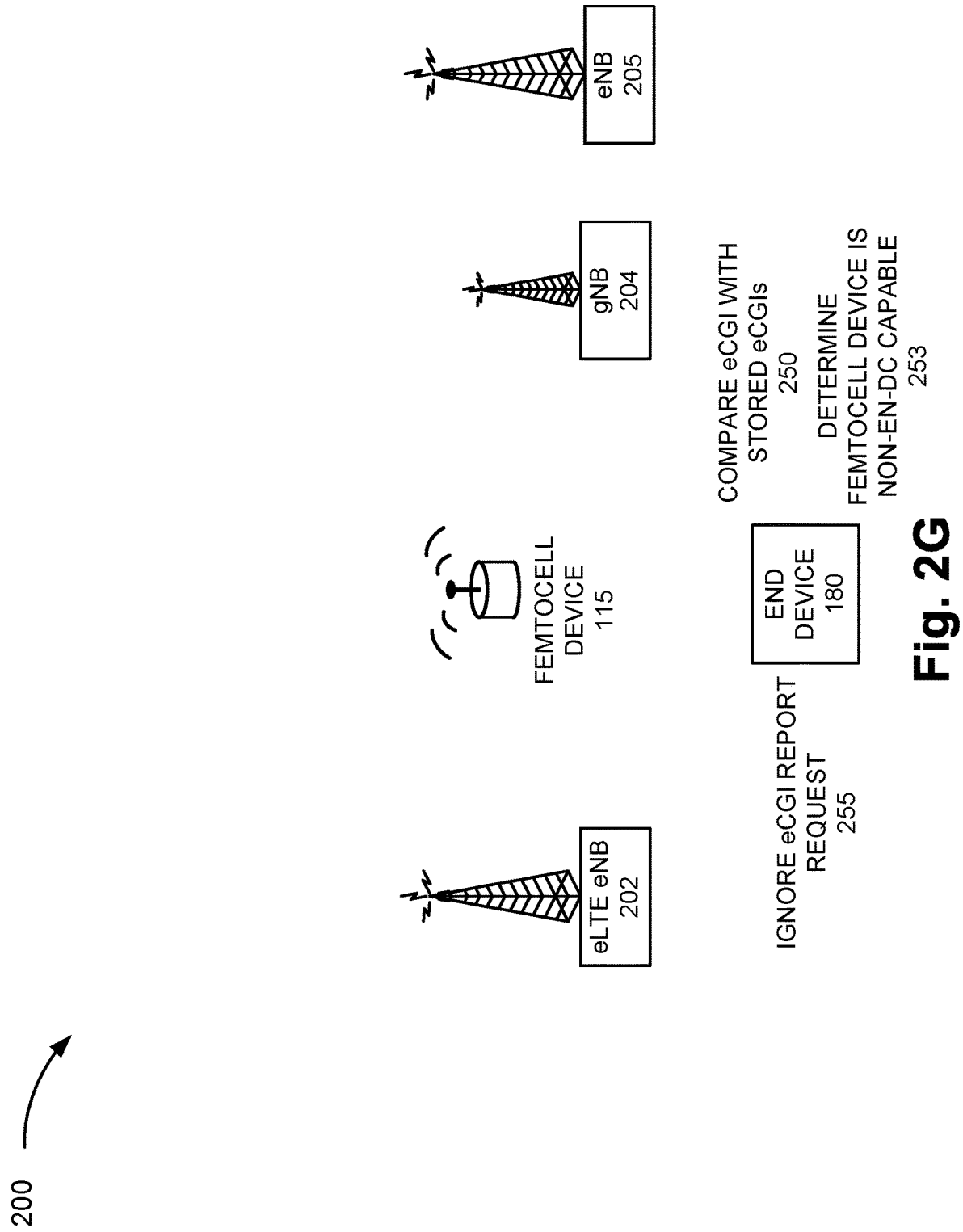

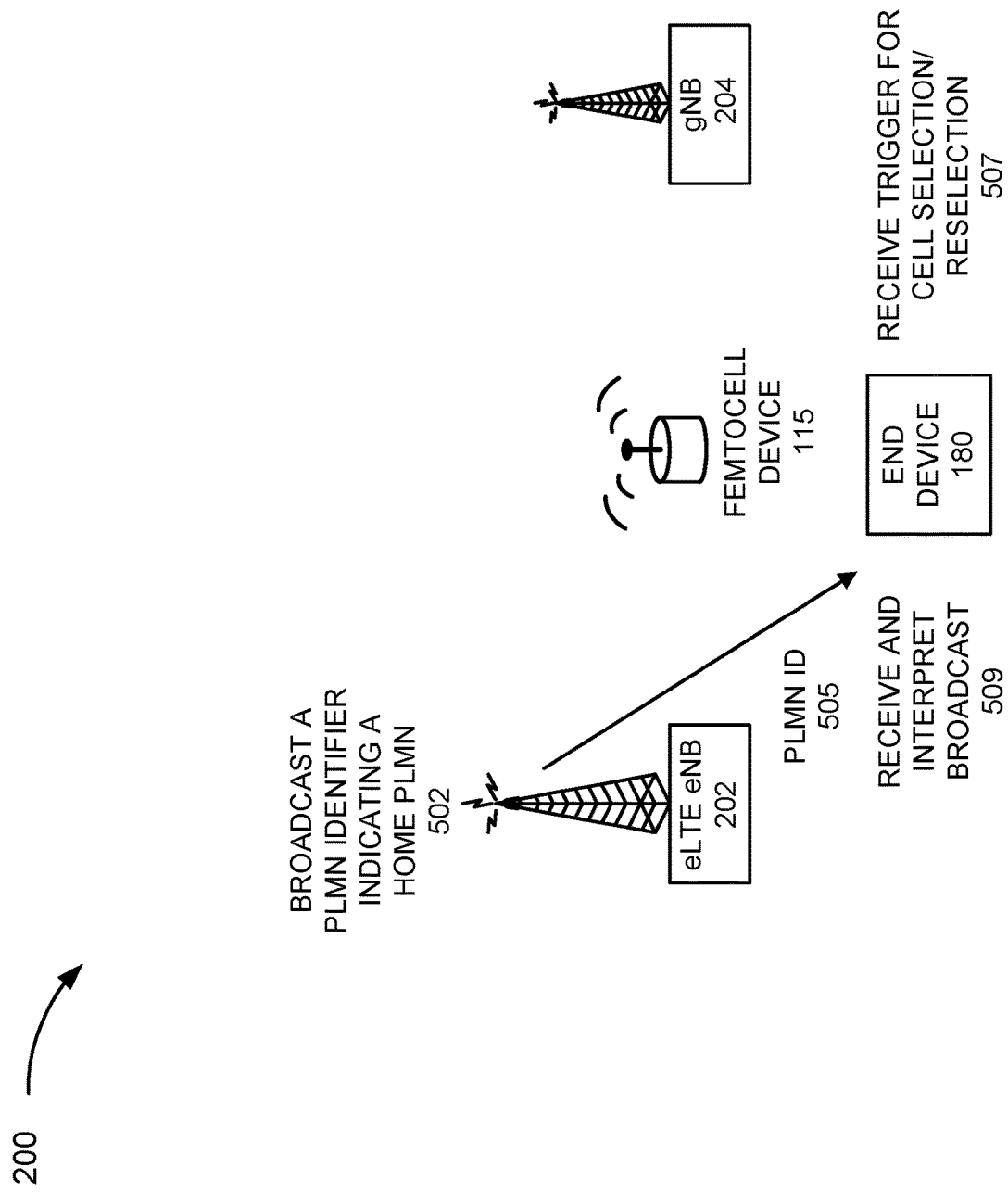

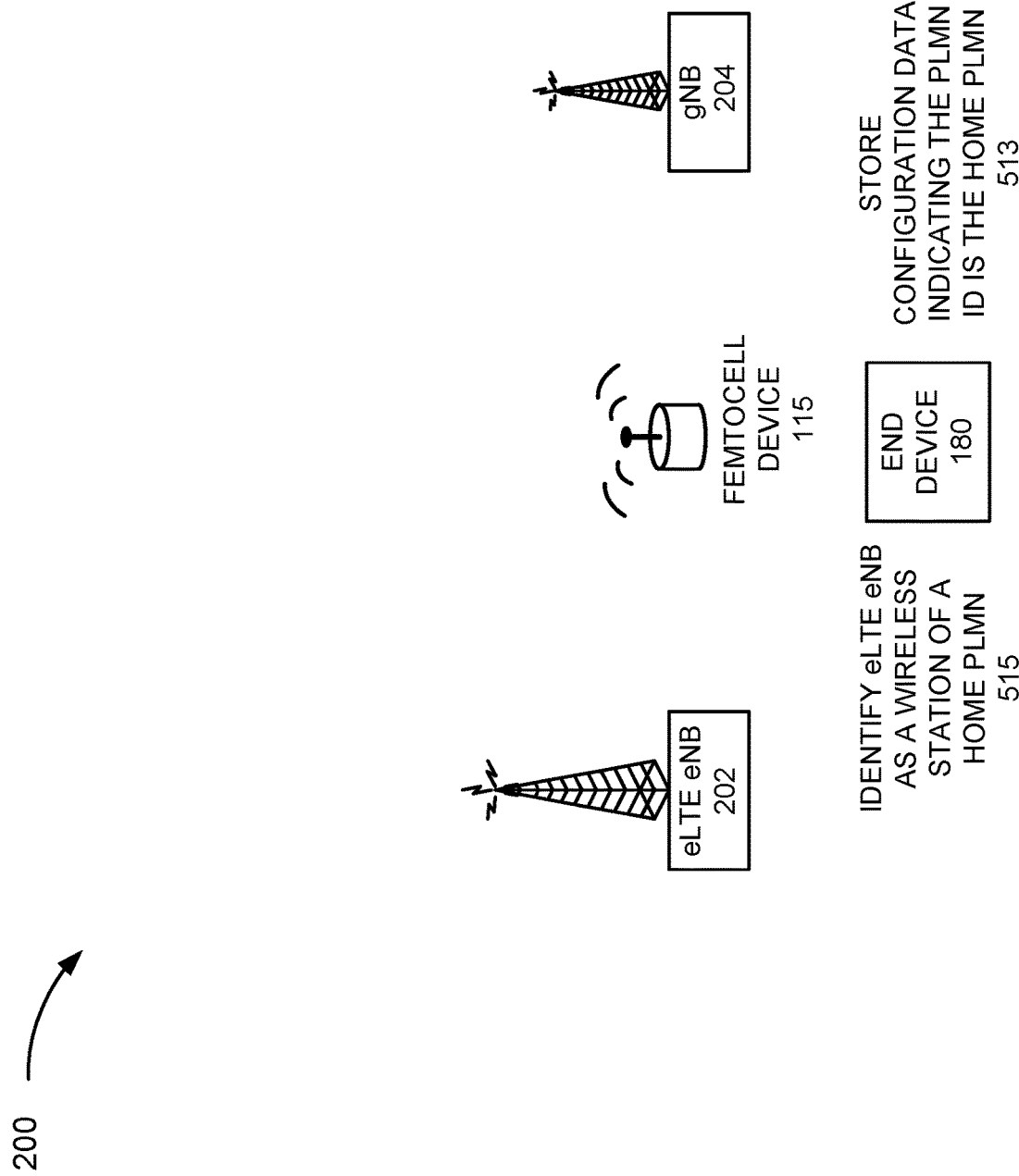

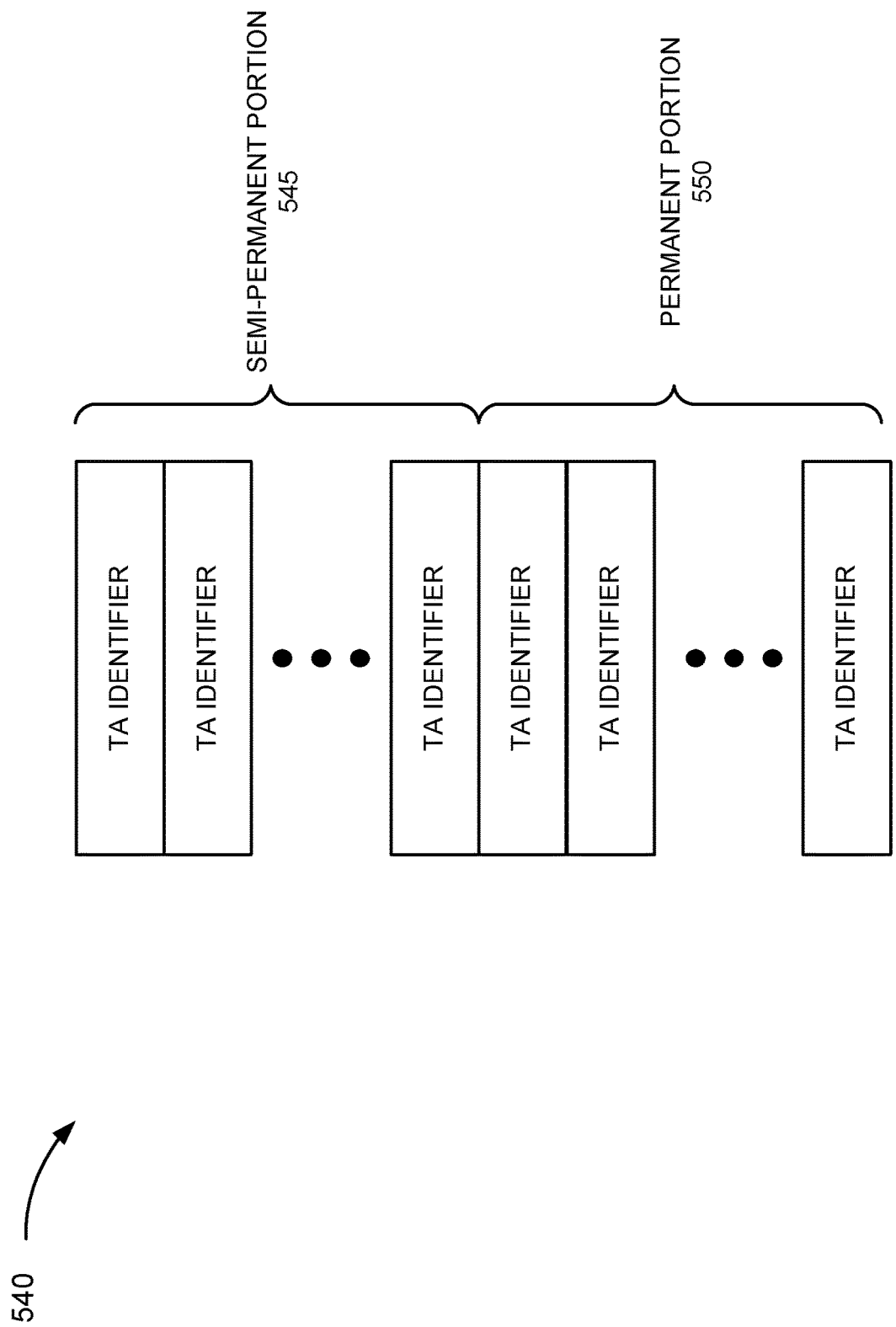

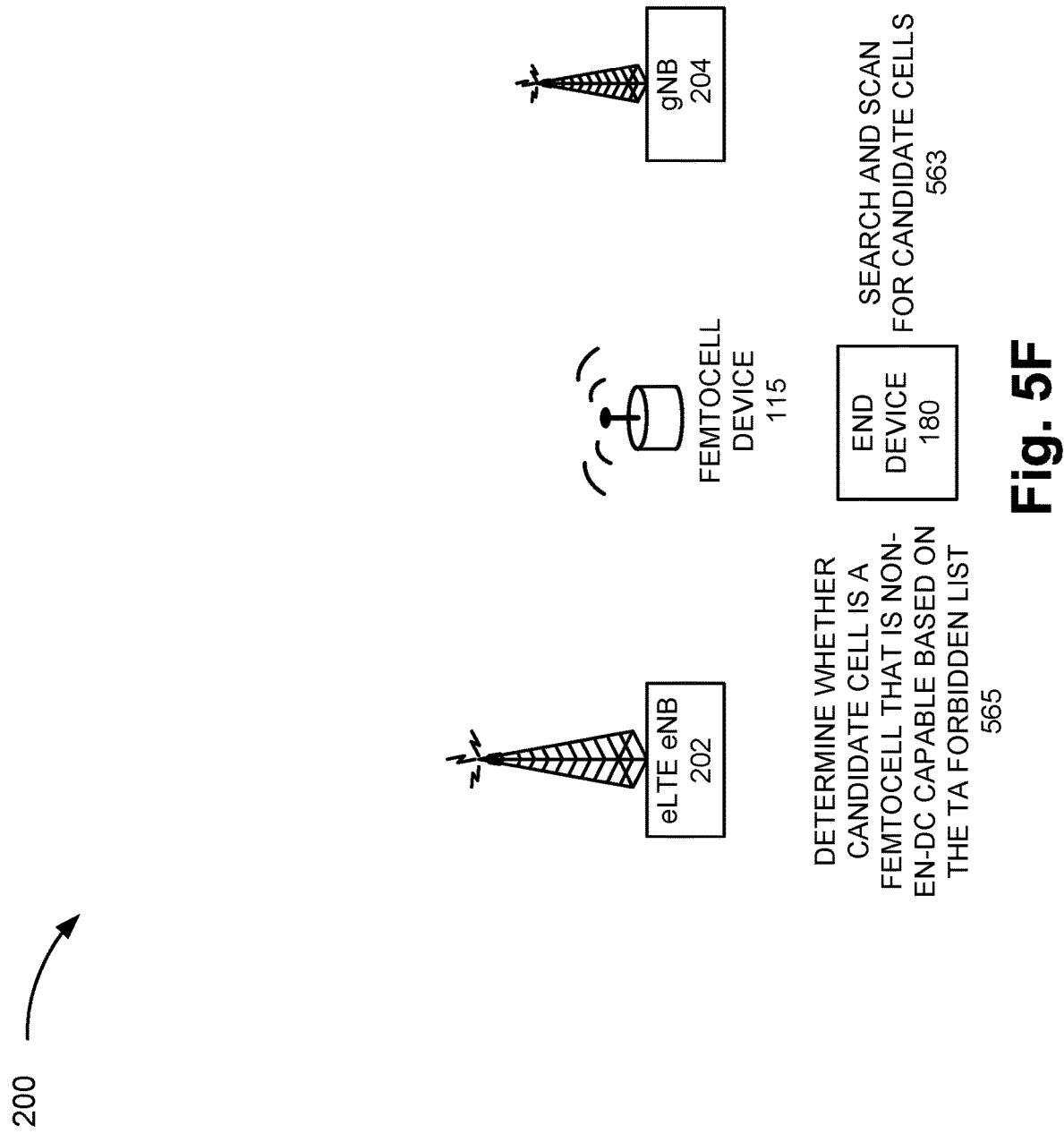

1200

CONFIGURE THE EN-DC CAPABLE END DEVICE WITH A TA FORBIDDEN LIST THAT INCLUDES A PERMANENT TA FORBIDDEN LIST AND A SEMI-PERMANENT TA FORBIDDEN LIST
1205

USE THE TA FORBIDDEN LIST TO SELECT A CANDIDATE CELL ON WHICH TO CAMP DURING A CELL SELECTION PROCEDURE OR A CELL RESELECTION PROCEDURE
1210

UPDATE THE PERMANENT TA FORBIDDEN LIST
1215

Fig. 12

CELL SELECTION MANAGEMENT FOR END DEVICE IN FEMTOCELL COVERAGE AREA

BACKGROUND

Development and design of multi-radio access technology (RAT) access networks present certain challenges from a network-side perspective and an end device perspective. Depending on how internetworking is configured, such configuration can yield undesirable results. For example, from a network perspective, the configuration may reduce effective use of available network resources. Accordingly a need exists to overcome these challenges.

BRIEF DESCRIPTION OF THE DRAWINGS

FIG. 1 is a diagram illustrating an exemplary environment in which an exemplary embodiment of a cell selection management service may be implemented;

FIGS. 2A-2H are diagrams illustrating exemplary processes of exemplary embodiments of the cell selection management service;

FIGS. 5A-5C are diagrams illustrating still another exemplary process of an exemplary embodiment of the cell selection management service;

FIGS. 5D-5F are diagrams illustrating still another exemplary process of an exemplary embodiment of the cell selection management service;

FIGS. 7-12 are flow diagrams illustrating exemplary processes of exemplary embodiments of the cell selection management service.

DETAILED DESCRIPTION OF PREFERRED EMBODIMENTS

Figure 2A:
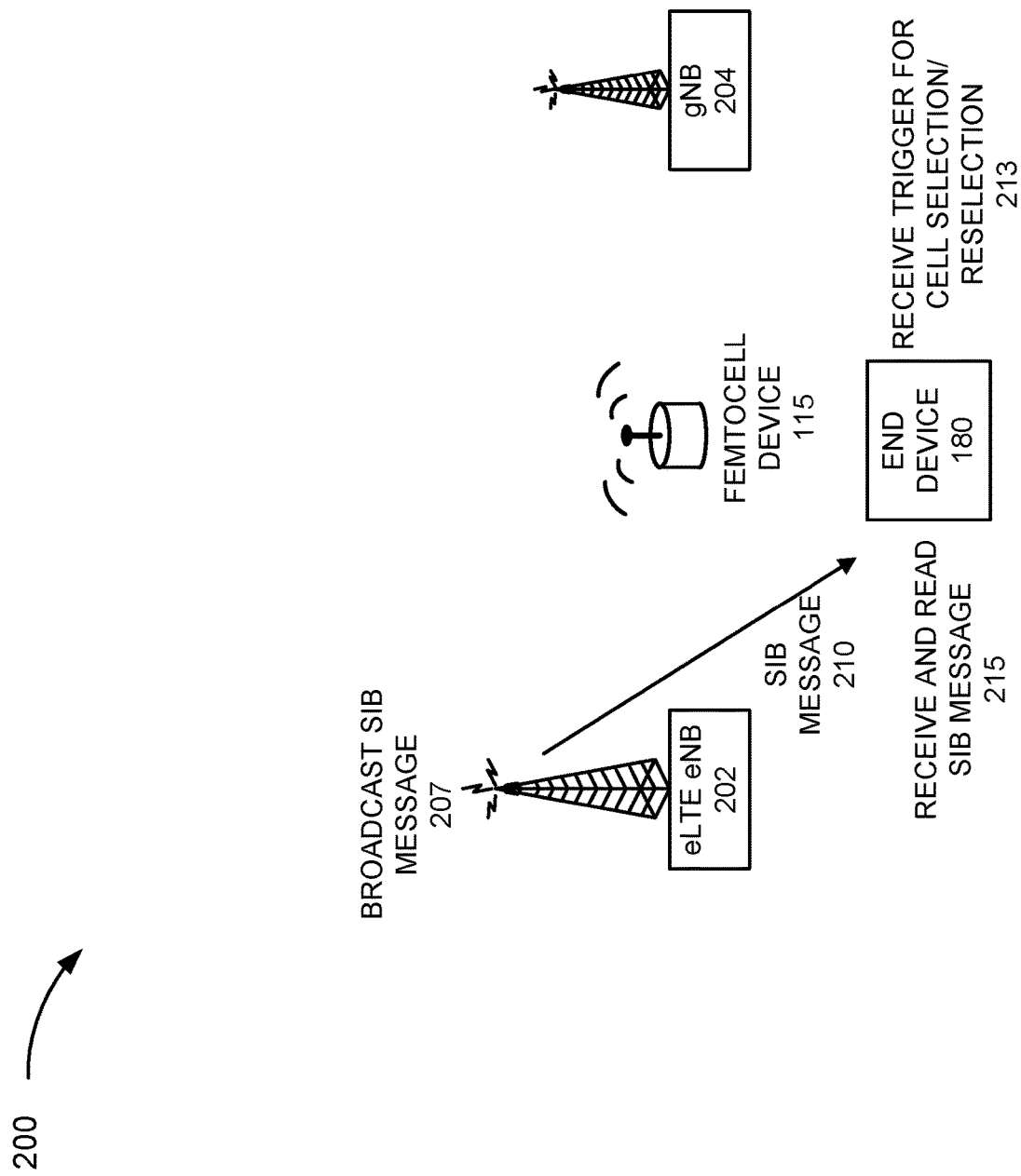

The following detailed description refers to the accompanying drawings. The same reference numbers in different drawings may identify the same or similar elements. Also, the following detailed description does not limit the invention.

A wireless network should support various use cases, meet various performance metrics, allow for scalability and flexibility, and so forth. However, in the design of the wireless network, there are legacy issues relating to existing wireless networks. For example, there are considerations relating to whether there will be interworking between the wireless network, which includes various network devices, and a legacy wireless network, which includes various legacy network devices, and if so, how such an interworking will be implemented. Furthermore, there are considerations relating to non-legacy end devices and their operation with respect to legacy network devices.

For an Evolved Universal Terrestrial Radio Access-New Radio (E-UTRA-NR) Dual Connectivity (EN-DC) end device (non-standalone) to acquire Fifth Generation (5G) NR service, the EN-DC end device has to establish a Radio Resource Control (RRC) connection with an EN-DC capable Long Term Evolution (LTE) cell (e.g., an LTE EN-DC device) and camp (e.g., attach) with the LTE EN-DC device. Currently, however, LTE femtocell devices do not support EN-DC. For example, a Fourth Generation (4G) femtocell does not connect to a 5G wireless station (e.g., a next generation Node B (gNB)). Therefore, if the EN-DC end device camps on an LTE femtocell (e.g., as the anchor cell device), the EN-DC end device will not be provided with 5G NR service even when the EN-DC end device is in a 5G NR coverage area.

In addition, a femtocell (e.g., a 4G femtocell, a 5G femtocell, etc.) may provide a 5G-capable wireless end device with wireless service that is subject to certain limitations in view of backhaul connectivity. For example, the limitations stemming from backhaul connectivity may include limitations in bandwidth and other communication metrics (e.g., Quality of Service (QoS) metrics, etc.) In this regard, the EN-DC end device or another type of future generation wireless end device (e.g., 5G, etc.) may not receive optimal wireless service when camping on the femtocell device (e.g., of a standalone configuration, etc.).

For EN-DC fixed wireless access (FWA) devices, the LTE and 5G NR coverage is pre-determined during installation and rarely changes. In view of this, if an open femtocell provides service coverage for a locale in which the new EN-DC FWA device is to be installed, the installation of the new EN-DC FWA device may fail. For example, if during installation, the new EN-DC FWA device camps on the femtocell, EN-DC service will not be provided. Alternatively, an already-installed EN-DC FWA device may move to the femtocell through normal cell reselection procedures and stay camped on the femtocell when cell reselection criteria are met. Unfortunately, according to either scenario, the EN-DC FWA device will not be able to acquire 5G NR service.

According to exemplary embodiments, a cell selection management service is described. According to an exemplary embodiment, the cell selection management service may be implemented in a multi-radio access technology (RAT) environment that supports multi-connectivity between a wireless network and an end device. According to an exemplary implementation, the cell selection management service may be implemented in an EN-DC environment. According to another exemplary implementation, the cell selection management service may be implemented in an NR-E-UTRA-DC (NE-DC) environment. According to yet another exemplary implementation, the cell selection management service may be implemented in a Next Generation (NG) radio access network (RAN) E-UTRA-NR DC (NGEN-DC) environment. According to still other exemplary implementations, the cell selection management service may be implemented in other types of dual or higher connectivity environments that may include additional and/or different RATs, 5G Standalone (SA), and so forth.

According to other exemplary embodiments, the cell selection management service may be implemented in any environment in which a femtocell device resides. For example, the environment may not include a multi-RAT environment and/or the environment may not support a multi-connectivity service.

According to an exemplary embodiment, the cell selection management service provides that an EN-DC end device ignores any non-EN-DC capable cell device during cell selection and cell reselection. According to another exemplary embodiment, the cell selection management service provides that the EN-DC end device ignores any non-EN-DC capable femtocell device during cell selection and cell reselection. According to still other exemplary embodiment, an EN-DC capable end device may ignore a femtocell device during cell selection and reselection in relation to various communication procedures. For example, the communication procedure may include an attachment procedure or a handover procedure.

According to still another exemplary embodiment, the cell selection management service provides that non-EN-DC capable femtocell devices are configured with unique tracking area (TA) identifiers such that when an EN-DC end device moves to/from the femtocell device, a non-access stratum (NAS) tracking area update (TAU) procedure is triggered. When the EN-DC end device moves to the femtocell and the network receives a TAU request, which includes a TA identifier, from the EN-DC end device, the network rejects the request. Additionally, when the EN-DC end device wishes to attach to a femtocell device, the EN-DC end device may transmit an attach request, which includes the TA identifier, to a core network device of the network. When the core network device receives the attach request, the core network device rejects the request.

According to yet another exemplary embodiment, the cell selection management service provides that a cell barring information element (IE) is broadcasted by the network and received by an EN-DC end device. The cell barring IE may indicate that a femtocell device is barred for all EN-DC end devices or a subset of EN-DC end devices (e.g., EN-DC FWA devices).

According to still yet another exemplary embodiment, the cell selection management service provides that the network uses a public land mobile network (PLMN) identifier. For example, an EN-DC capable evolved Node B (eNB) may broadcast a unique PLMN identifier in a System Information Block message for EN-DC end devices. The EN-DC end device may store a PLMN identifier that indicates a home PLMN. The EN-DC end device may compare the broadcasted PLMN identifier to the stored PLMN identifier in order to determine whether the EN-DC capable eNB is EN-DC capable (e.g., as an anchor cell that is locally connected to a 5G cell). In this way, when the PLMN identifiers match, the EN-DC end device may camp on the EN-DC capable anchor device even if, for example, a non-EN-DC capable femtocell is deemed to provide stronger wireless coverage during the cell selection or cell reselection procedure. Also, when accessing the EN-DC network, the EN-DC end device may include the unique PLMN identifier in a message of an RRC Connection procedure, and in turn, the EN-DC capable eNB may select the appropriate core network.

According to a further embodiment, the cell selection management service provides that a permanent tracking area forbidden list stores TAs associated with femtocells (e.g., LTE femtocell, etc.). The EN-DC capable end device may store the permanent tracking area forbidden list and use the list to avoid camping on the femtocells included in the list.

As a result, the cell selection management service may improve network resource utilization in a network. For example, the cell selection management service may improve the use of various network resources (e.g., physical, logical, virtual) in relation to network devices of an access network or network devices of the access network and a core network based on the use of connectivity services (e.g., DC, etc.) for EN-DC capable end devices. Additionally, the cell selection management service may minimize the camping on a femtocell which in turn may avoid the unnecessary setting up and tearing down of bearers (e.g., radio bearers, data radio bearers (DRBs) to the core network, signal radio bearers (SRBs), etc.) and subsequent cell reselection. Additionally, from an end device perspective, the cell selection management service may improve resource utilization at the EN-DC end device by avoiding camping on non-EN-DC capable femtocell devices, as well as improve connectivity and network services for the EN-DC end device by virtue of access and use of 5G NR wireless services, DC services, and so forth.

FIG. 1 is a diagram illustrating an exemplary environment 100 in which an exemplary embodiment of the cell selection management service may be implemented. As illustrated, environment 100 includes an access network 105 and a core network 150. Access network 105 includes a master wireless station 110, a secondary wireless station 112, and a femotcell device 115. Core network 150 includes core devices 155. Environment 100 further includes an end device 180.

The number, the type, and the arrangement of network devices in access network 105 and core network 150, as illustrated and described, are exemplary. The number of end devices 180 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the network devices, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fourth Generation (4G) RAN, a 4.5G RAN, a 5G RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, and an NG RAN. Access network 105 may further include other types of wireless networks, such as a WiFi network, a Worldwide Interoperability for Microwave Access (WiMAX) network, a local area network (LAN), or another type of network that may provide an on-ramp to master wireless station 110 and/or secondary wireless station 112.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technology (RAT), etc.), wireless standards, wireless frequencies/bands, and so forth. Access network 105 may include different and multiple functional splitting, such as plane splitting (e.g., user plane, control plane, etc.), centralized unit (CU) and distributed unit (DU), etc., as well as other types of network services, such as DC, non-standalone (NSA), carrier aggregation (CA), network slicing, coordinated multipoint (CoMP), and/or another type of connectivity service.

Master wireless station 110 includes a network device that supports one or multiple RATs and includes logic that provides a cell selection management service, as described herein. Additionally, master wireless station 110 includes logic that supports a DC service in which master wireless station 110 operates as a master node. For example, master wireless station 110 may include logic that supports a master cell group (MCG) split bearer service and one or multiple other types of DC services (e.g., a secondary cell group (SCG) split bearer service, an SCG bearer service, an MCG bearer service, etc.). According to some exemplary embodiments, master wireless station 110 may be implemented as an Evolved LTE (eLTE) eNB. eLTE eNB supports EN-DC service. According to other exemplary embodiments, master wireless station 110 may be implemented as an eNB.

Secondary wireless station 112 includes a network device that supports one or multiple RATs and may or may not include logic that provides a cell selection management service, as described herein. Additionally, secondary wireless station 112 includes logic that supports a DC service in which secondary wireless station 112 operates as a secondary node. For example, secondary wireless station 112 may include logic that supports an SCG split bearer service and one or multiple other types of DC services (e.g., an MCG split bearer service, an SCG bearer service, and MCG bearer service, etc.). According to various exemplary embodiments, secondary wireless station 112 may be implemented as a gNB.

Core network 150 includes a complementary network of access network 105. For example, core network 150 may be implemented to include an Evolved Packet Core (EPC) of an LTE, a core network of an LTE-Advanced (LTE-A) network, a core network of an LTE-A Pro network, and/or a next generation core (NGC) network. Core network 150 may include a legacy core network.

Depending on the implementation, core network 150 may include various types of network devices that are illustrated in FIG. 1 as core devices 155. According to an exemplary embodiment, one or multiple core devices 155 include logic that provides the cell selection management service, as described herein. For example, core devices 155 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core devices 155 may include additional, different, and/or fewer network devices than those described.

End device 180 includes a device that has computational and wireless communication capabilities. According to an exemplary embodiment, end device 180 includes logic that provides the cell selection management service, as described herein. According to an exemplary embodiment, end device 180 includes an EN-DC capable device. For purposes of description, an EN-DC capable device includes an EN-DC capable FWA device and an EN-DC capable non-FWA device (non-standalone 5G). According to other exemplary embodiments, end device 180 may include a 5G (SA, NSA, etc.) or future generation wireless capable device.

Depending on the implementation, end device 180 may be a mobile device, a portable device, or a stationary device. For example, end device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, an FWA device, or other types of wireless end nodes. By way of further example, end device 180 may be implemented as a smartphone, a personal digital assistant, a tablet, a netbook, a phablet, a wearable device (e.g., a watch, glasses, etc.), a set top box, an infotainment system in a vehicle, a vehicle support system, a smart television, a game system, a music playing system, or other types of wireless end devices. End device 180 may be configured to execute various types of software (e.g., applications, programs, etc.). The number and the types of software may vary among end devices 180.

End device 180 may support multiple RATs (e.g., 4G, 5G, etc.) and various portions of the radio spectrum (e.g., multiple frequency bands, multiple carrier frequencies, etc.). Additionally, end device 180 may include one or multiple communication interfaces that provide one or multiple (e.g., simultaneous) connections via the same or different RATs, frequency bands, and so forth. The multimode capabilities of end device 180 may vary among end devices 180.

FIGS. 2A-2H are diagrams illustrating exemplary processes of exemplary embodiments of the cell selection management service. As illustrated, an environment 200, which is consistent with environment 100, includes an eLTE eNB 202, a gNB 204, femtocell device 115, and end device 180. For example, master wireless station 110 may be implemented as eLTE eNB 202, and secondary wireless station 112 may be implemented as gNB 204.

Referring to FIG. 2A, eLTE eNB 202 may broadcast a System Information Block (SIB) message 207. For example, the SIB message 210 may be a SIB Type 2 message that carries data indicating that eLTE eNB 202 is locally connected to gNB 204 (e.g., a 5G cell). By way of further example, the data may be implemented as a 1 bit indicator or other type of parameter (e.g., a parameter that may be set to True or False, missing versus present in the SIB message, etc.). End device 180 may receive a trigger for cell selection or cell reselection 213. The trigger may be any event that causes end device 180 to invoke a cell selection procedure or cell reselection procedure. For example, the triggering event may pertain to when a boot-up process of end device 180, when end device 180 loses radio connection, when a radio connection falls below a threshold value, or another type of condition. Subsequent to the trigger event, end device 180 may receive and read the SIB message 215. Based on the reading of the SIB message, end device 180 may determine that eLTE eNB 202 supports EN-DC.

Referring to FIG. 2B, as a part of the cell selection procedure or the cell reselection procedure, end device 180 may search and scan for candidate cells 218. During this process, end device 180 is configured to determine whether a candidate cell supports EN-DC 220.

Referring to FIG. 2C, according to an exemplary scenario, during the searching and scanning, end device 180 may identify eLTE eNB 202 as a candidate cell, and based on the SIB message, determine that eLTE eNB 202 is EN-DC capable 223. As a result, end device 180 may determine to camp on the candidate cell 225 (e.g., eLTE eNB 202). For example, although not illustrated, end device 180 may invoke a Radio Resource Control (RRC) Connection Establishment procedure directed to eLTE eNB 202.

Referring to FIG. 2D, assume that environment 200 further includes an eNB 205. According to another exemplary scenario, during the searching and scanning for candidate cells, end device 180 may identify eNB 205 and/or femtocell device 115. However, in contrast to the previously explained exemplary scenario, end device 180 does not have any information indicating that eNB 205 is EN-DC capable. For example, the SIB message of eNB 205 (not illustrated) does not indicate that eNB 205 is EN-DC capable. Alternatively, the SIB message of femtocell device 115 (not illustrated) does not indicate that femtocell device 115 is EN-DC capable. Based on these circumstances, end device 180 may identify eNB 205 and/or femtocell device 115 as a candidate cell(s), but one(s) that is/are not EN-DC capable 228. Based on this determination, end device 180 may determine whether other candidate cells are available 230. For example, end device 180 may continue to search and scan for other candidate cells.

According to an exemplary embodiment of the cell selection management service, when end device 180 is unable to determine a candidate cell that is EN-DC capable, end device 180 may camp on a non-EN-DC capable cell 233 (e.g., eNB 205 or femtocell device 115) when no other candidate cell is available, as illustrated in FIG. 2E. According to an exemplary embodiment of the cell selection management service, when end device 180 camps on the non-EN-DC capable cell (e.g., eNB 205, femtocell device 115), end device 180 may periodically or otherwise continue to scan for a neighbor cell that is an EN-DC capable cell on which to camp. In this regard, end device 180 may temporarily camp on the non-EN-DC capable cell. Otherwise, according to another exemplary scenario, when there is another candidate cell that is EN-DC capable (e.g., eLTE eNB 202), end device 180 will preferably camp on the EN-DC capable cell 235, as further illustrated in FIG. 2E.

Figure 2F:
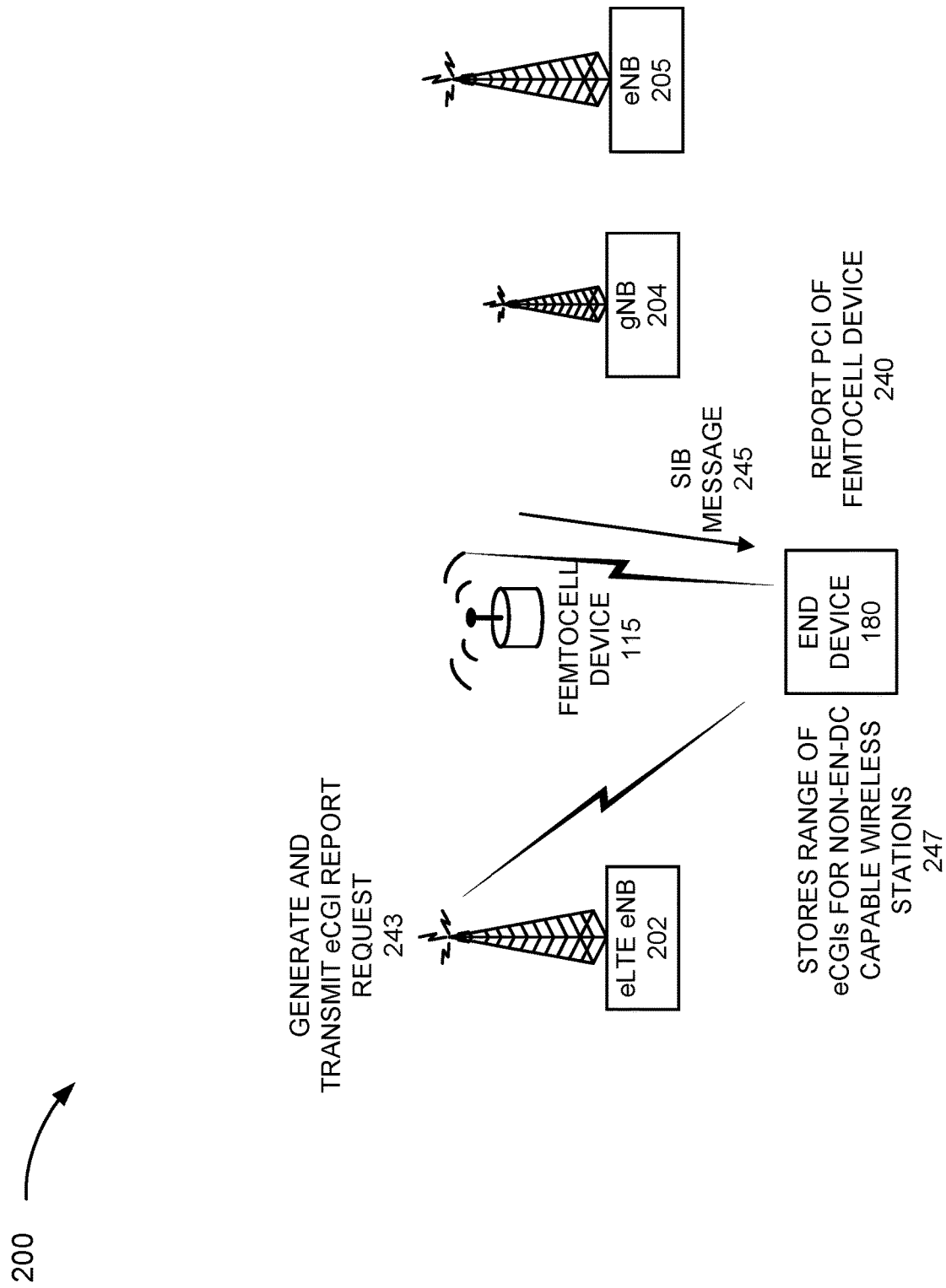
Figure 2H:
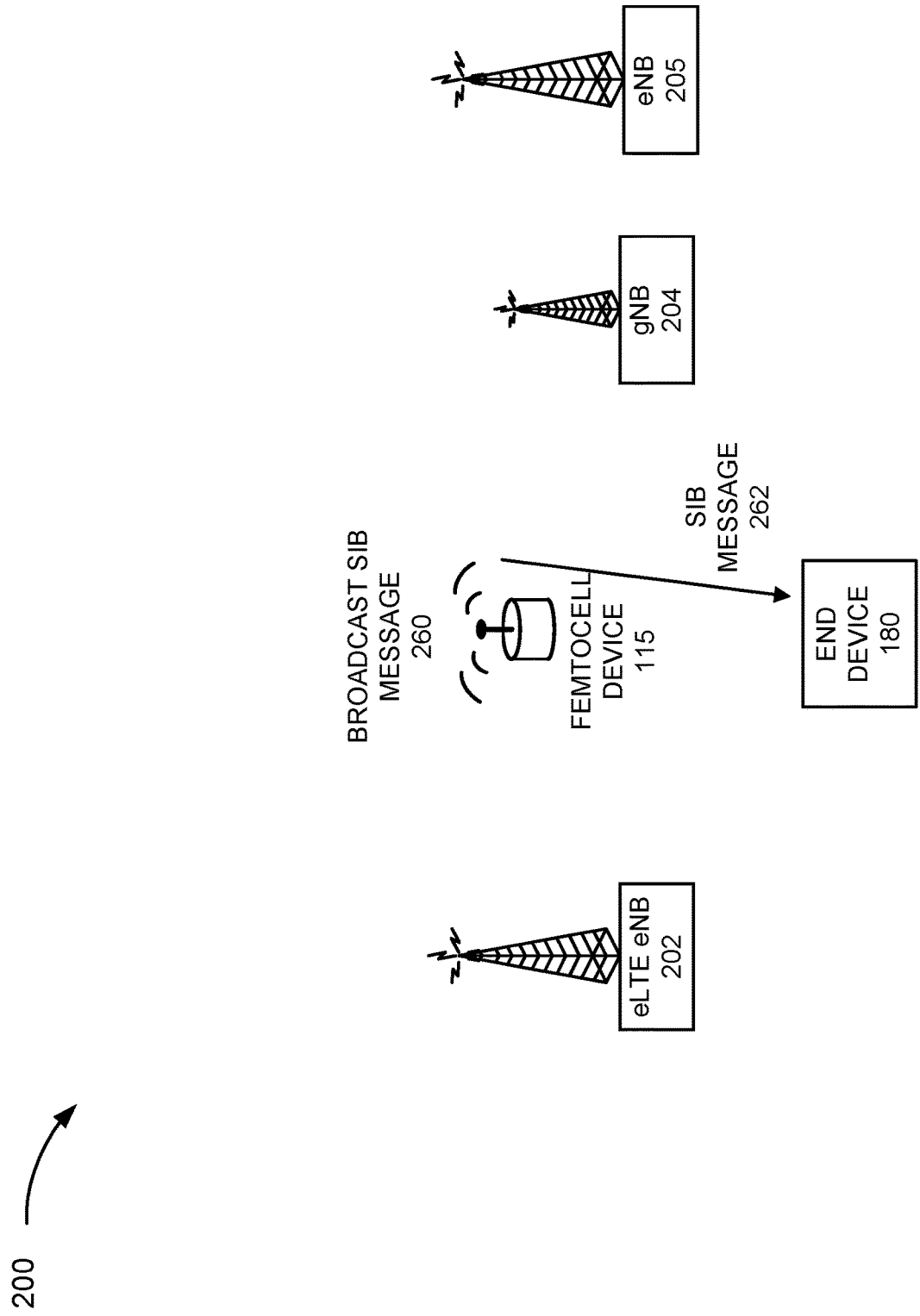

Referring to FIG. 2F, according to an exemplary embodiment, the cell selection management service includes management of handovers to non-EN-DC capable cells. For example, according to an exemplary scenario, assume during a cell reselection procedure, end device 180 reports the physical cell identity (PCI) of femotcell device 115 to eLTE eNB 202. eLTE eNB 202 receives the report but PCIs for non-EN-DC capable wireless stations (e.g., femtocell device 115) are not configured on eLTE eNB 202 as a neighbor cell. Based on such a configuration, eLTE eNB 202 generates and transmits an extended Cell Global Identifier (eCGI) report request 243 to end device 180. In response to receiving the request, end device 180 tunes to receive a SIB message 245 (e.g., Type 1), which includes the eCGI, from femtocell device 115. According to an exemplary embodiment, end device 180 stores eCGIs (e.g., a black list, a range of eCGIs, etc.) that indicate non-EN-DC capable cells/wireless stations 247.

Referring to FIG. 2G, in response to receiving the SIB message from femtocell device 115, end device 180 compares the received eCGI to the stored eCGIs 250. Based on a result of the comparison, end device 180 determines that femtocell device 115 is a non-EN-DC capable device 253. Based on this determination, end device 180 ignores the eCGI report request 255 from eLTE eNB 202, and a handover procedure to femtocell device 115 is prevented.

According to other exemplary embodiments, the cell selection management service may use other types of information to avoid or minimize the occurrence of end device 180 camping on a non-EN-DC capable cell or another type of femtocell. For example, referring to FIG. 2H and in correspondence to a process illustrated in FIG. 2A and associated with eLTE eNB 202, femtocell device 115 may broadcast a SIB message 260. For example, the SIB message 262 may be a SIB Type 1 message that includes an eCGI, a PCI, and/or CSG information (e.g., CSG indication and CSG identity) pertaining to femtocell device 115. According to a process similar to that previously described, when a cell selection or a cell reselection procedure is triggered, end device 180 may receive and read the SIB message from femtocell device 115, and determine whether femtocell device 115 is a candidate cell that is EN-DC capable. According to this exemplary process, end device 180 may store data (e.g., one or multiple lists, a range of eCGIs, a range of PCIs, etc.) that enables end device 180 to determine that femtocell device 115 is non-EN-DC capable based on a comparison between the data and the received eCGI and/or PCI. Alternatively, for example, end device 180 may avoid camping on the femtocell device 115 based on the CSG information. For example, the mere presence of CSG information may be interpreted by end device 180 that the SIB message pertains to a femtocell device that is non-EN-DC capable. Similar to the process previously described, end device 180 may determine to camp on femtocell device 115 when there is no other available cell that is EN-DC capable. It may be assumed that end device 180 may be associated with a subscriber that would not be blocked from camping on femtocell device 115 based on the CSG information. Further, end device 180 may continue to search for an EN-DC capable device subsequent to camping on femtocell device 115, in a manner previously described. According to other exemplary embodiments, the SIB message may be a SIB Type 2 message that may or may not carry data (e.g., 1 bit indicator or other type of parameter) regarding whether femtocell device 115 is locally connected to a 5G cell (e.g., gNB 204). End device 180 may avoid camping on femtocell device 115 based on the SIB message.

Although FIGS. 2A-2H illustrate an exemplary process of the cell selection management service, according to other exemplary embodiments, the process may include additional, different, and/or fewer steps, and/or include additional, different, and/or fewer messages. For example, according to the exemplary scenario described in relation to FIGS. 2F and 2G, if end device 180 is unable to find a new candidate cell that is EN-DC capable for handover, end device 180 may respond to the eCGI report request, and camp on femtocell device 115.

Figure 3A:
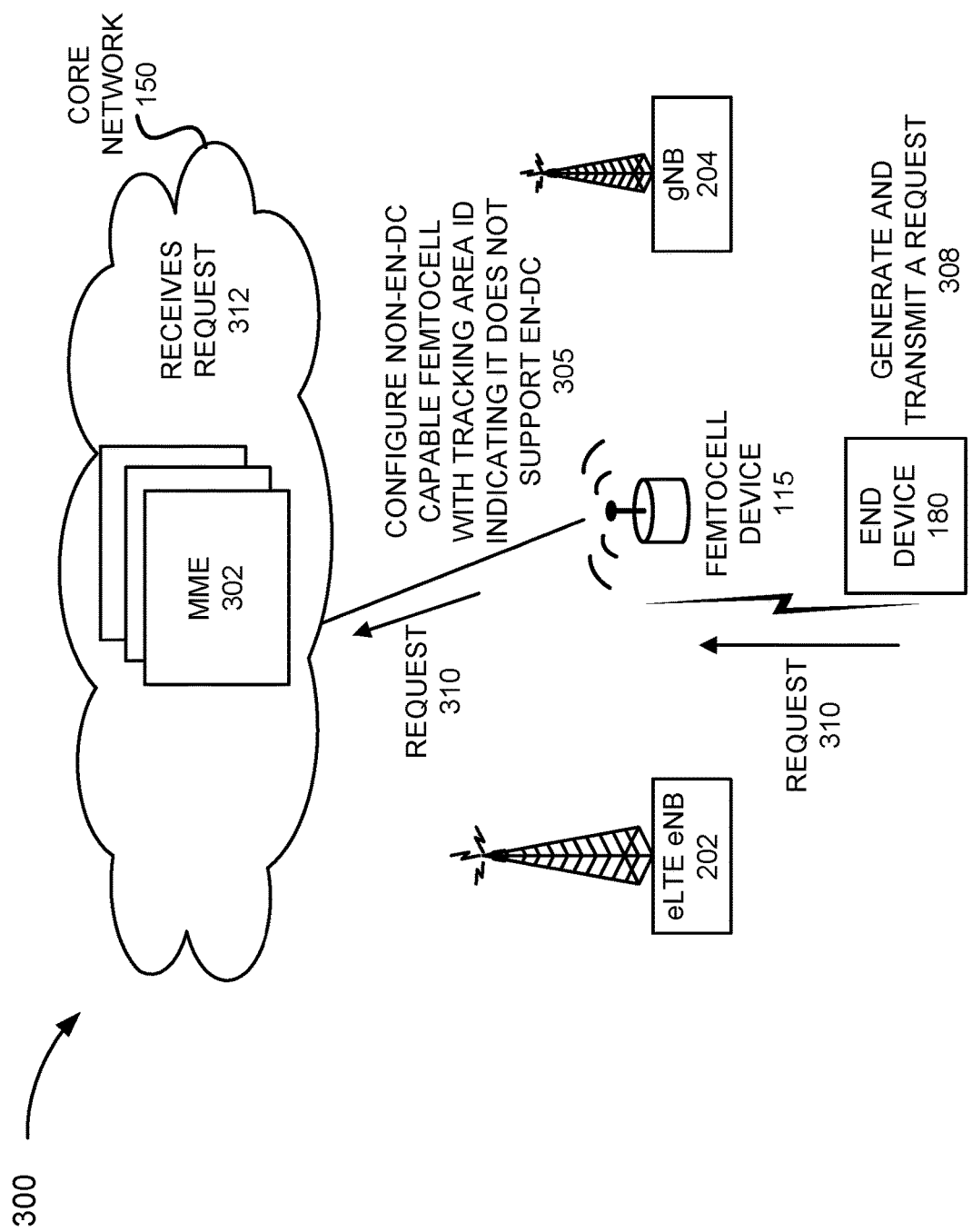
FIGS. 3A-3C are diagrams illustrating another exemplary process of an exemplary embodiment of the cell selection management service.
Figure 3B:
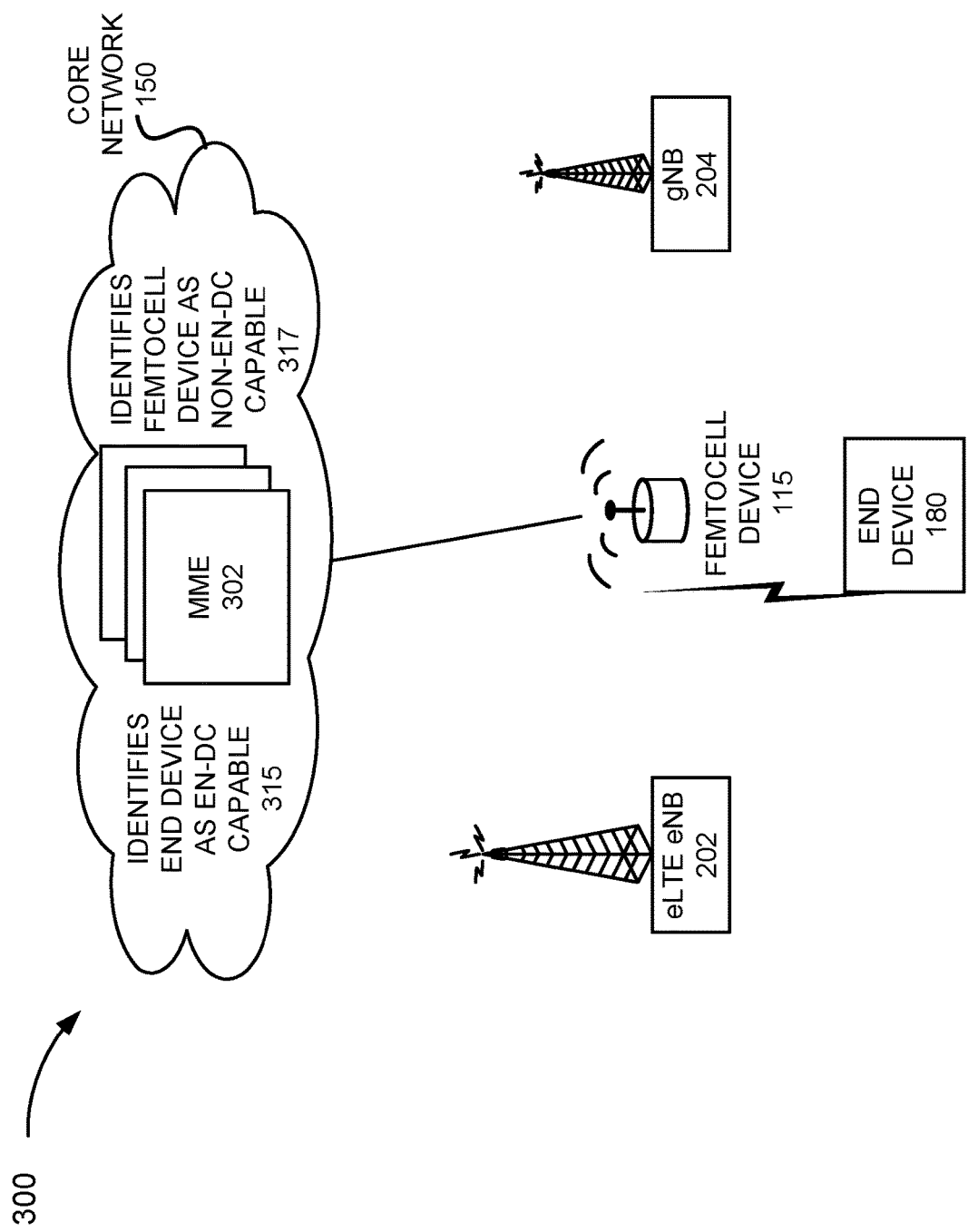
Figure 3C:
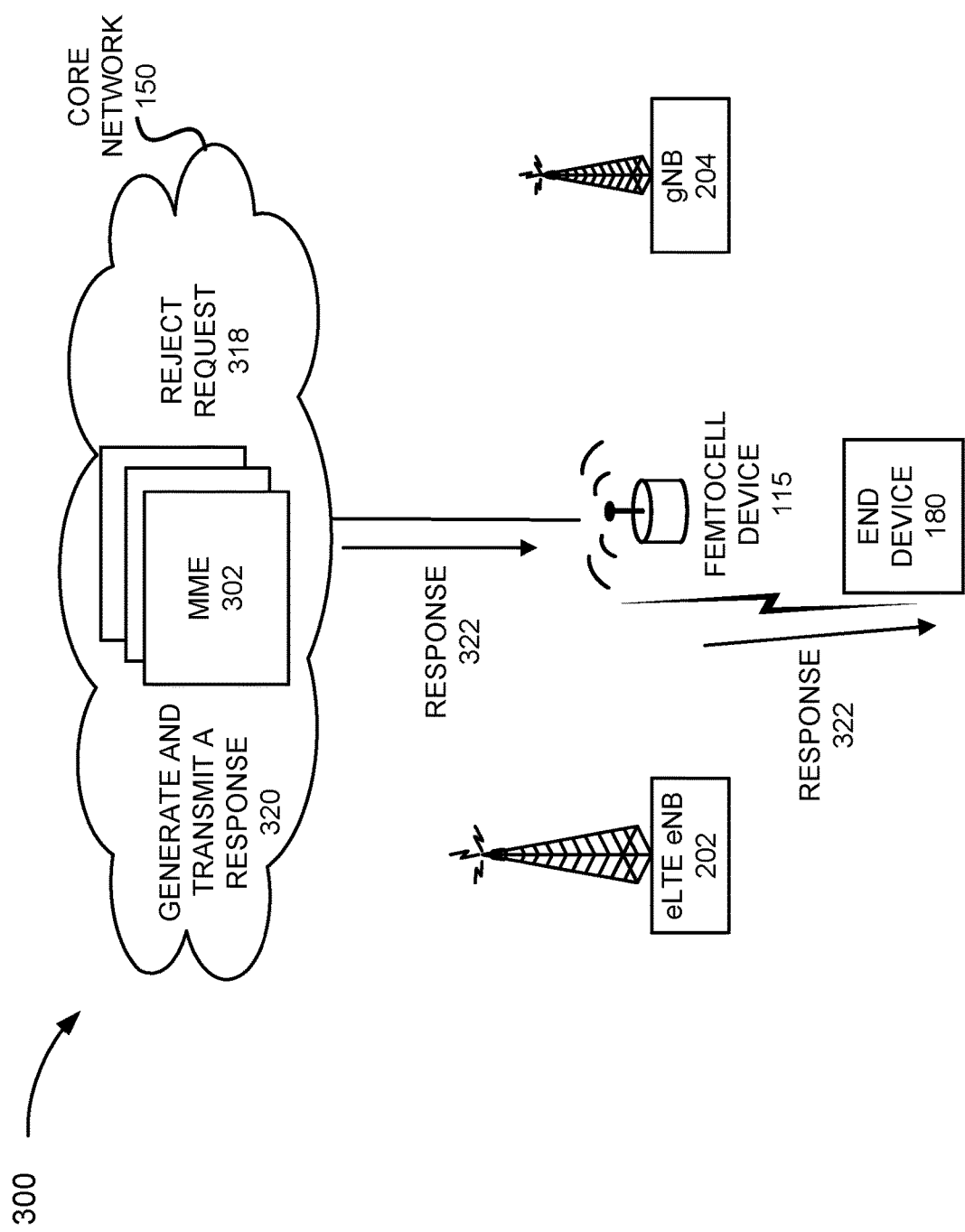

FIGS. 3A-3C are diagrams illustrating another exemplary process of the cell selection management service. Referring to FIG. 3A, assume that femtocell device 115 is configured with a TA identifier that indicates it does not support EN-DC 305. As further illustrated, end device 180 may generate and transmit a request 308. For example, the request 310 may be an attachment request or a tracking area update (TAU) request. The request 310 may propagate via femtocell device 115 to an MME 302 of core network 150. MME 302 receives the request 312.

Referring to FIG. 3B, in response to receiving the request, MME 302 may identify end device 180 as an EN-DC capable device 315. For example, MME 302 may use subscription data pertaining to end device 180 such that the subscription data includes data that indicates end device 180 as an EN-DC capable device. Alternatively, for example, an identifier of end device 180 (e.g., International Mobile Subscriber Identity (IMSI), etc.) may be within a certain range of IMSIs that have been allocated to end devices that are EN-DC capable. MME 302 may also identify that femtocell device 115 is a non-EN-DC capable device 317. For example, MME 302 may determine that femtocell device 115 is a non-EN-DC capable device based on a TA identifier included in the TAU of the attach request of end device 180. According to one exemplary implementation, MME 302 may store TA identifiers that indicate non-EN-DC capable service areas. MME 302 may compare the TA information included in the request to those stored TA identifiers. Although not illustrated, MME 302 may further identify that end device 180 is in an EN-DC service area. For example, MME 302 may determine neighboring cells relative to end device 180 that are an EN-DC service area.

Referring to FIG. 3C, in response to determining that end device 180 is an EN-DC capable device; that femtocell device 115 is a non-EN-DC capable device; and that end device 180 is in an EN-DC service area; MME 302 may determine to reject the request 318. In response to this determination, for example, MME 302 may generate and transmit a response to rejects the attachment request or the TAU request. For example, response 322 may include an EPS Mobility Management (EMM) with a cause code (e.g., Tracking Area Not Allowed, No Suitable Cells in Tracking Area, etc.) or another instance of data that rejects the request.

Although FIGS. 3A-3C illustrate an exemplary process of the cell selection management service, according to other exemplary embodiments, the process may include additional, different, and/or fewer steps, and/or include additional, different, and/or fewer messages. For example, if end device 180 is unable to find a new candidate cell that is EN-DC capable, end device 180 may retransmit the request. MME 302 may be configured to accept the request when the request is retransmitted or received within a configurable time window.

Figure 4:
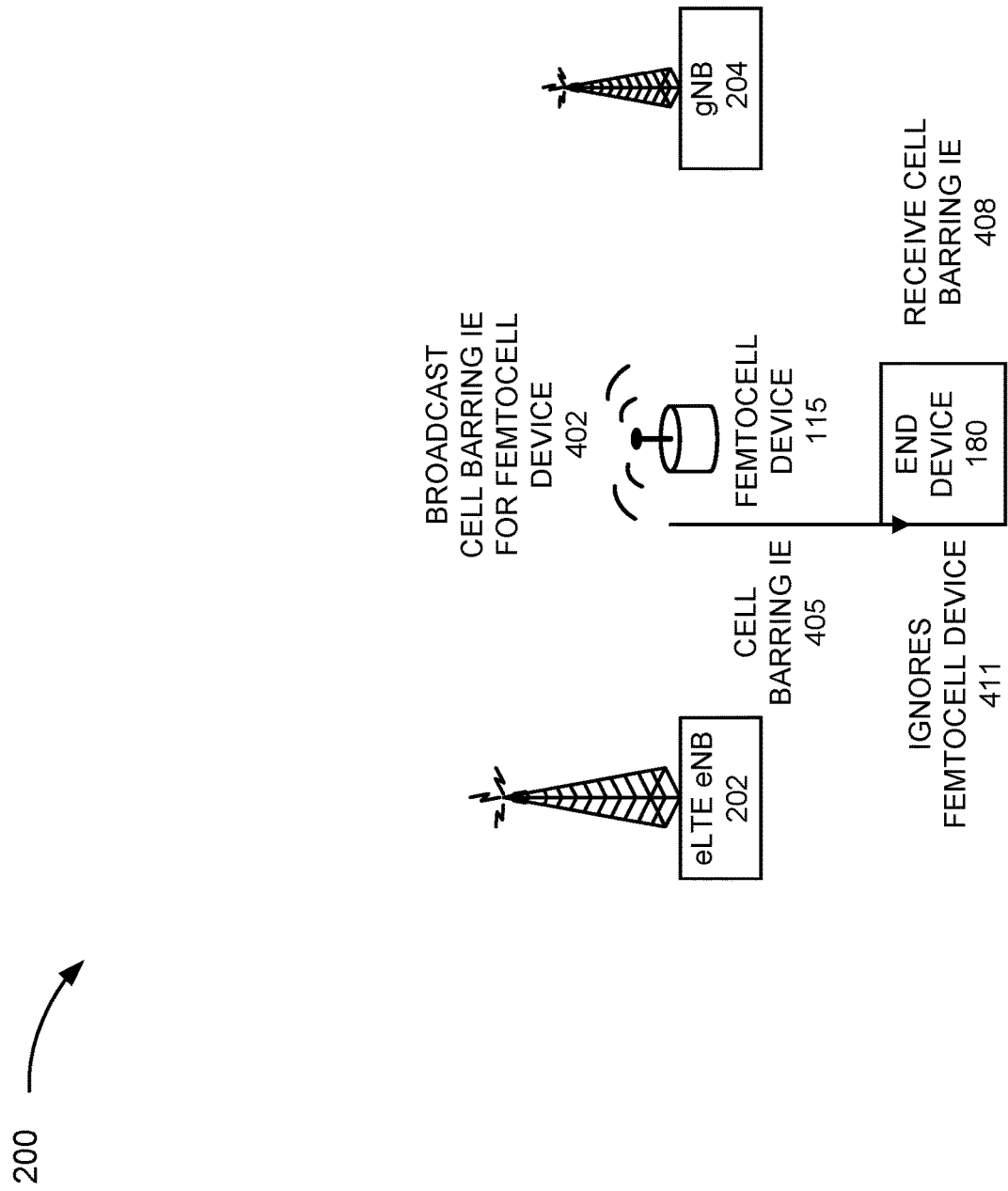
FIG. 4 is a diagram illustrating yet another exemplary process of an exemplary embodiment of the cell selection management service.

FIG. 4 is a diagram illustrating yet another exemplary process of an exemplary embodiment of the cell selection and management service. Referring to FIG. 4, access network 105 (e.g., femtocell device 115 or an eNB that is not EN-DC capable (not illustrated)) may broadcast a cell barring information element (IE) that bars femtocell device 402 (e.g., a non-EN-DC capable femtocell device 115). For example, the cell barring IE may be included in a SIB message (e.g., Type 1). According to an exemplary implementation, the cell barring IE may bar the femtocell for only EN-DC FWA devices. According to another exemplary implementation, the cell barring IE may bar the femtocell for all EN-DC end devices (e.g., FWA and non-FWA). A portion of an exemplary SIB message is illustrated below.

As illustrated above, a new cell barring IE (i.e., cellBarredENDC) (e.g., new relative to LTE standards, 3GPP standards, etc.) may be included in the SIB message. According to other exemplary implementations, the cell barring information may be included in an existing cell barring IE (e.g., cellBarred) (e.g., relative to LTE standards, 3GPP standards, etc.) to include, for example, barredENDCFWA and barredENDCALL.

Further to this process, as illustrated, end device 180 receives the cell barring IE 408. In response to reading the cell barring information, end device 180 ignores femtocell device 411 as a candidate cell on which to camp in relation to a cell selection or a cell reselection procedure, as described herein.

Although FIG. 4 illustrates an exemplary process of the cell selection management service, according to other exemplary embodiments, the process may include additional, different, and/or fewer steps, and/or include additional, different, and/or fewer messages. For example, if end device 180 is unable to find a new candidate cell that is EN-DC capable, end device 180 may camp on femtocell device 115, as well as perform other operations subsequent to camping, as previously described.

Figure 5C:
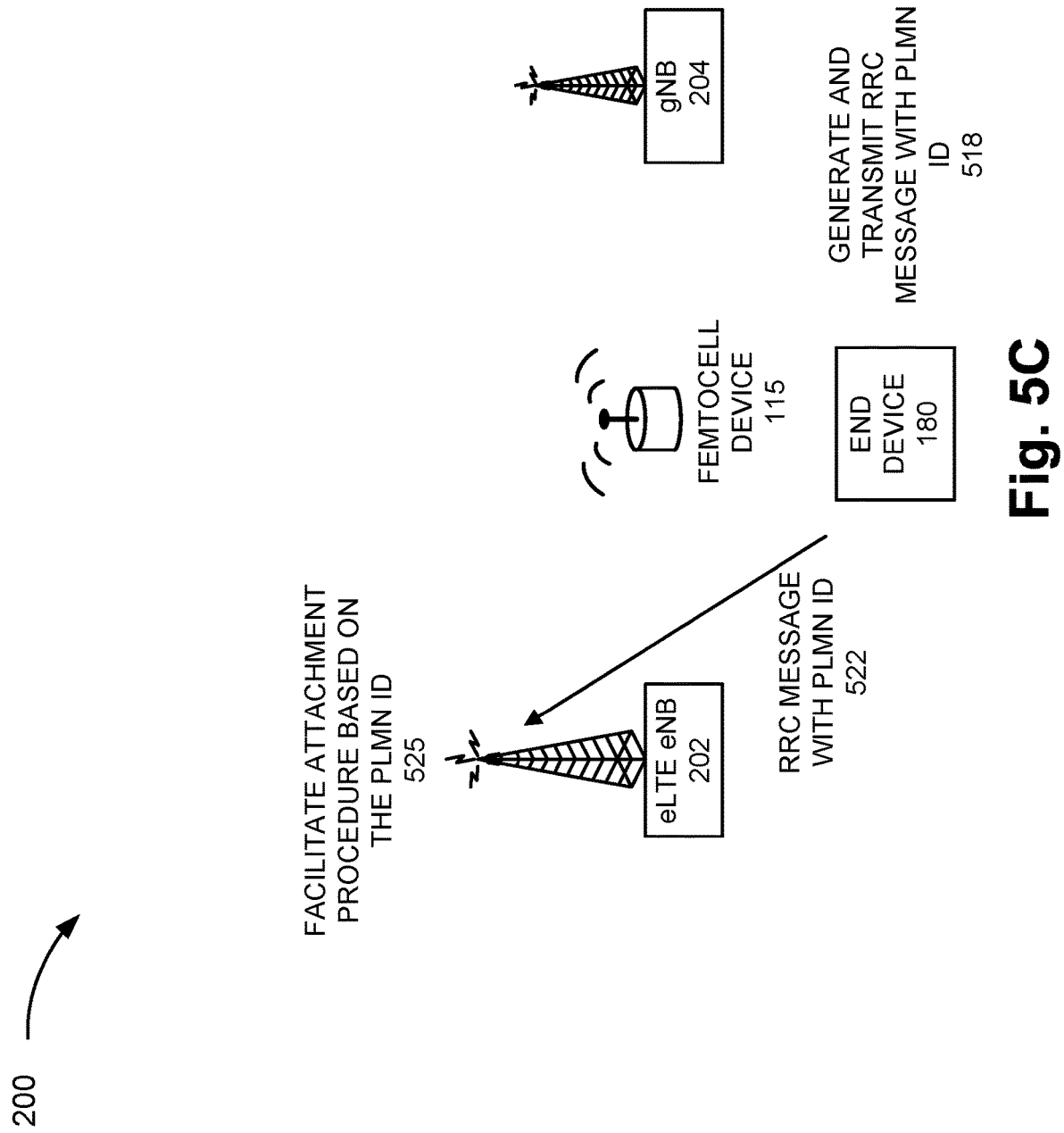

FIGS. 5A-5C are diagrams illustrating still another exemplary process of the cell selection management service. Referring to FIG. 5A, access network 105 (e.g., eLTE eNB 202) may broadcast a PLMN identifier that indicates a home PLMN 502 for EN-DC capable end devices (e.g., end device 180). According to an exemplary implementation, the PLMN identifier may be a dedicated PLMN identifier for EN-DC capable end devices. In other words, eLTE eNB 202 may broadcast one PLMN identifier (e.g., 311480 or another value) that indicates a home PLMN for end devices other than EN-DC capable end devices and another PLMN identifier (e.g., 311280 or another value) that indicates a home PLMN for (only) EN-DC capable end devices. According to some exemplary implementations, eLTE eNB 202 may be configured with this broadcast of dual PLMN identifiers in service areas where EN-DC FWA devices are deployed. eLTE eNB 202 may broadcast the PLMN identifier in a SIB message (e.g., Type 1). eLTE eNB 202 may also broadcast, in a SIB message (e.g., Type 2), which includes data indicating that eLTE eNB 202 is locally connected to a 5G cell, as previously described, for both PLMN identifiers.

As further illustrated in FIG. 5A, end device 180 may receive a trigger for cell selection or cell reselection 507. Subsequent thereto, end device 180 may receive and interpret the broadcast that includes the PLMN identifier 509. Referring to FIG. 5B, end device 180 may store configuration data that includes data indicating a home PLMN identifier 513. For example, the home PLMN identifier may be stored in a universal integrated circuit card (UICC), a subscriber identity module (SIM) card, or another type of resident memory. By way of further example, in accordance with the example above, the configuration data may indicate

```
SystemInformationBlockType1 ::=   Sequence {
    cellAccessRelatedInfo             Sequence {
        plmn-IdentityList                 PMLN-IdentityList,
        trackingAreaCode                  TrackingAreaCode,
        cellIdentity                      CellIdentity,
        cellBarred                        ENUMERATED {barred, notbarred},
        cellBarredENDC                    ENUMERATED {barredFWA, barredALL,
                                              notbarred}
    }
``` that 311280 or another value is a home PLMN. End device 180 may compare the PLMN identifier received in the broadcast to the stored configuration data, and identify that eLTE eNB 202 is a wireless station of the home PLMN 515. Referring to FIG. 5C, in response to this determination, end device 180 generates and transmits an RRC message that includes the PLMN identifier 518. For example, RRC message with PLMN id 522 may be implemented as an RRC Connection Setup Complete message that includes the PLMN identifier (e.g., 311280 or another value). In response to receiving the RRC message, eLTE eNB 202 uses the PLMN identifier as a basis to facilitate an attachment procedure 525. For example, eLTE eNB 202 may determine that end device 180 is an EN-DC capable device (e.g., an EN-DC FWA device).

Although FIGS. 5A-5C illustrate an exemplary process of the cell selection management service, according to other exemplary embodiments, the process may include additional, different, and/or fewer steps, and/or include additional, different, and/or fewer messages. For example, end device 180 may use information included in the SIB Type 2 message, as previously described, to identify eLTE eNB 202 as an EN-DC capable wireless station.

Figure 5D:
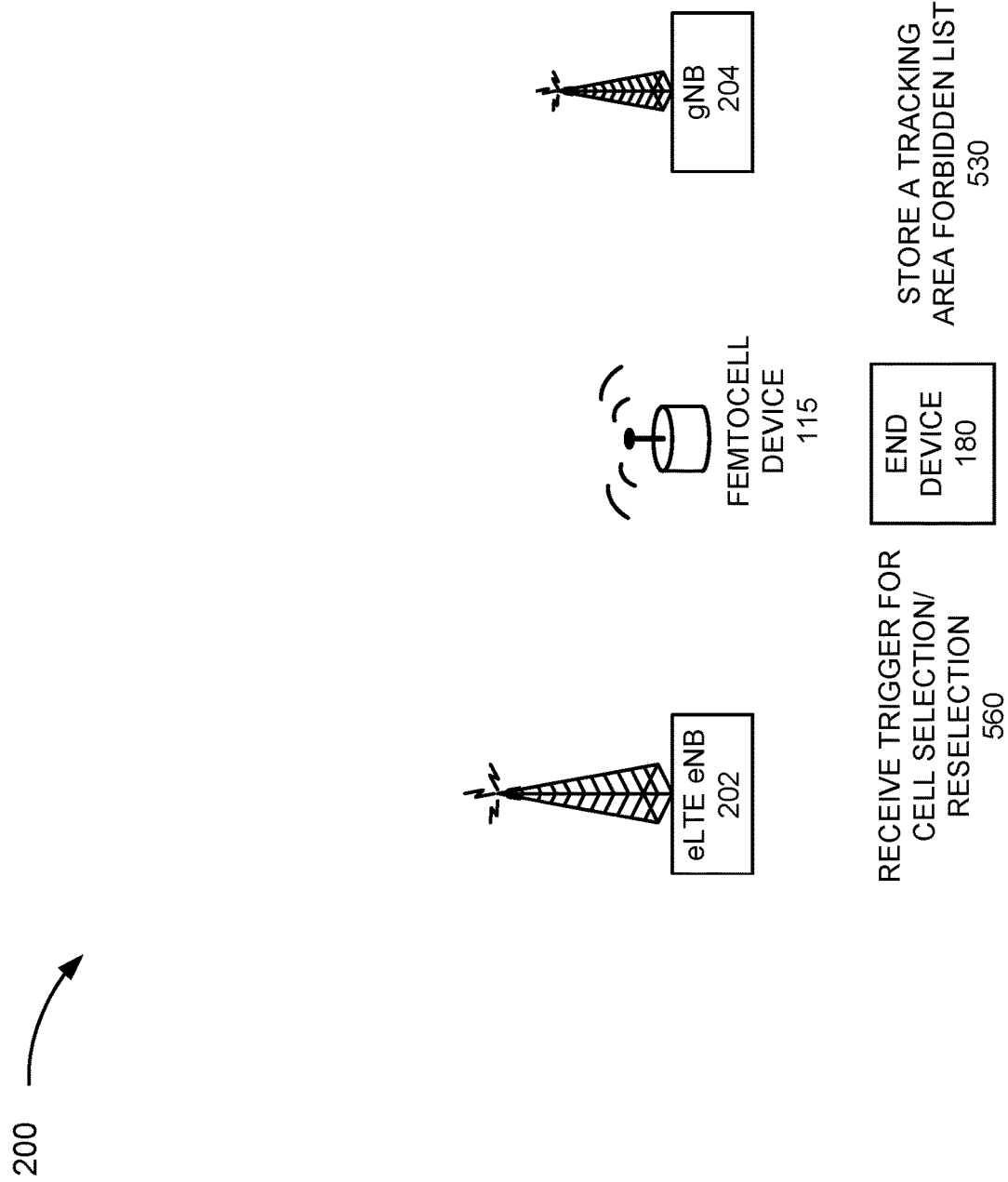

FIG. 5D-5F is a diagram illustrating an exemplary process of the cell selection management service. Referring to FIG. 5D, end device 180 may store a tracking area forbidden list 530. Referring to FIG. 5E, according to an exemplary embodiment, a tracking area forbidden list 540 includes a semi-permanent portion 545 and a permanent portion 550. Semi-permanent portion 545 is used to temporarily store TA identifiers that are forbidden. For example, the TA identifiers of the semi-permanent portion 545 may be erased by end device 180 during a power cycle or after a limited time period transpires (e.g., 24 hours or another configurable time period). In contrast, permanent portion 550 is used to permanently store TA identifiers that are forbidden. According to an exemplary implementation, permanent portion 550 may store a TA identifier pertaining to a femtocell that is non-EN-DC capable (e.g., a 4G femtocell). According to other exemplary implementations, permanent portion 550 may store a TA identifier pertaining to another type of femtocell (e.g., a 5G femtocell or another type of femtocell).

According to an exemplary embodiment, permanent portion 550 may be pre-configured on end device 180. For example, femtocells may be associated with TA identifiers within a certain range or placed in a limited set of tracking areas. According to an exemplary embodiment, semi-permanent portion 545 and permanent portion 550 may be updated. For example, core network 150 (e.g., MME 302) may reject femtocells on which to camp, as previously described (e.g., EMM cause code), which causes end device 180 to add or update permanent portion 550 with the TA identifier when the TA identifier is not already stored in permanent portion 550.

Referring back to FIG. 5D, subsequent to the storing of the TA forbidden list, end device 180 may receive a trigger for cell selection or cell reselection 560. Referring to FIG. 5F, end device 180 may search and scan for candidate cells 563. Based on the results of the searching and scanning, end device 180 may determine whether a candidate cell is a femtocell that is non-EN-DC capable based on the TA forbidden list 565. For example, end device 180 compares the TA identifier of a candidate cell to the TA forbidden list. Thereafter, end device 180 may perform similar processes in relation to camp or not camp according to processes previously described.

Although FIGS. 5D-5F illustrate an exemplary process of the cell selection management service, according to other exemplary embodiments, the process may include additional, different, and/or fewer steps, and/or include additional, different, and/or fewer messages.

Figure 6:
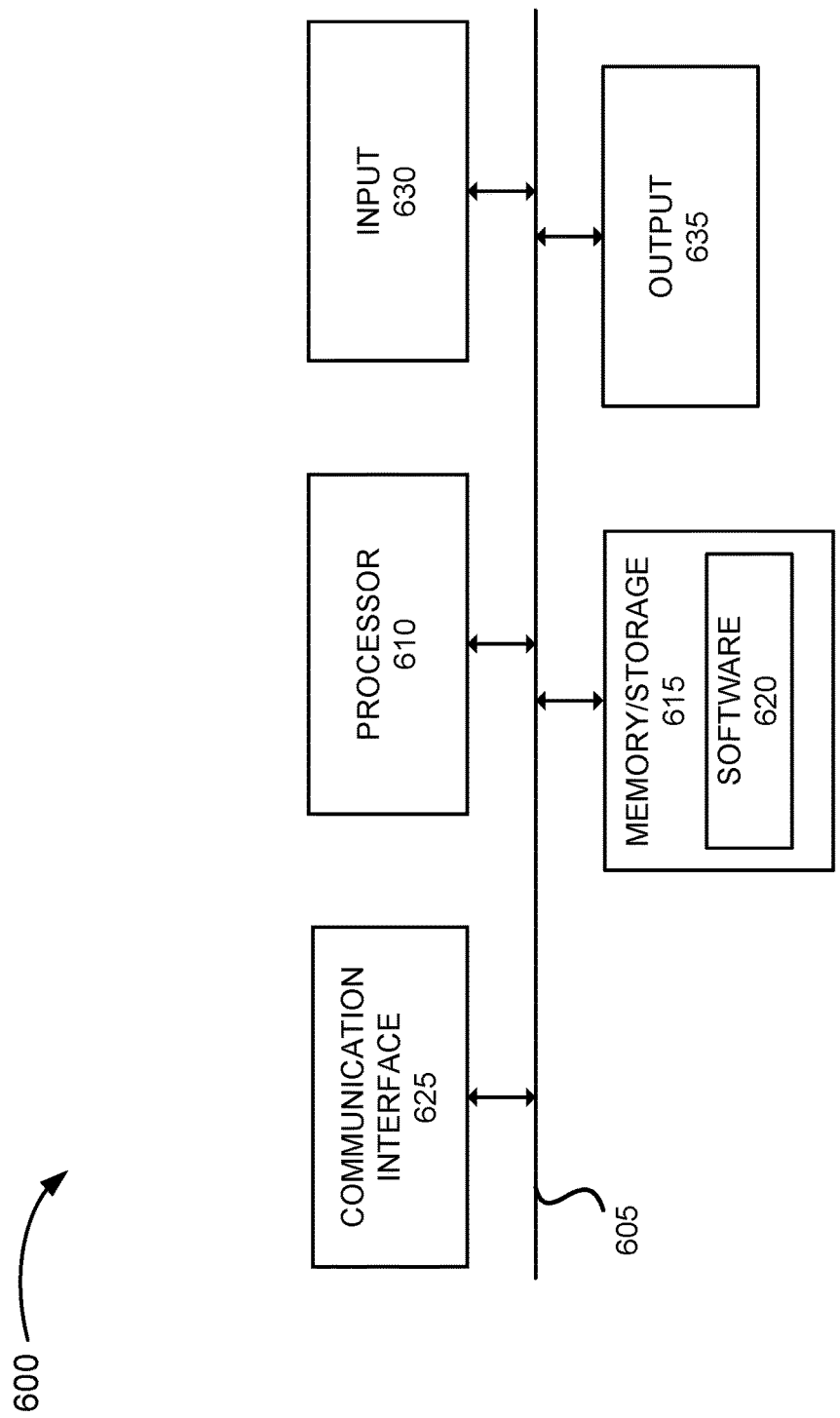
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may correspond to components included in network devices (e.g., master wireless station 110, secondary wireless station 112, femtocell device 115, eLTE eNB 202, gNB 204, eNB 205) of access network 105, network devices (e.g., core devices 155, MME 302) in a core network, and end device 180. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium.

Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with respect to end device 180, software 620 may include an application that, when executed by processor 610, provides a function of the cell selection management service, as described herein. Additionally, with reference to eLTE eNB 202 or another network device, software 620 may include an application that, when executed by processor 610, provides a function of the cell selection management service, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service based interface, etc.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, spun up, spun down, etc., using well-known virtualization techniques in a public/private cloud or other type of network.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7:
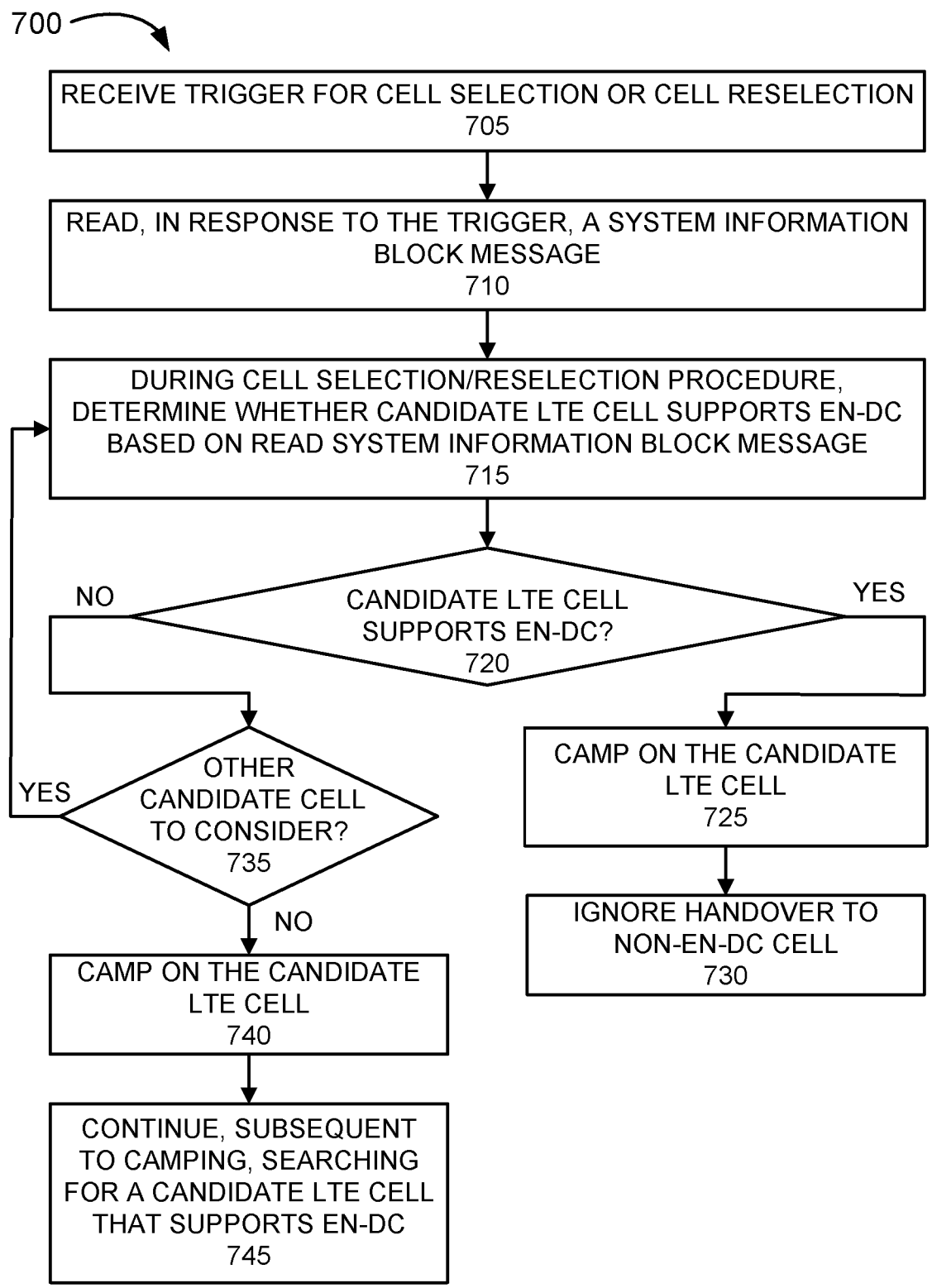

FIG. 7 is a flow diagram illustrating an exemplary process 700 of an exemplary embodiment of the cell selection management service. According to an exemplary embodiment, end device 180 performs steps of process 700. For example, processor 610 executes software 620 to perform a step illustrated in FIG. 7 and described herein. Additionally, or alternatively, a step illustrated in FIG. 7 may be performed by execution of only hardware.

In block 705, a trigger for cell selection or cell reselection may be received. In block 710, in response to the trigger, a SIB message may be read. For example, the SIB message may be a Type 2 message. The SIB message includes data or by omission of data indicates whether the candidate cell device is locally connected to a 5G cell. For example, a parameter (e.g., upperLayerIndication-r15) or 1 bit indicator may indicate this information. In block 715, during the cell selection/reselection procedure, it is determined whether a candidate LTE cell supports EN-DC based on the SIB message. In block 720—YES, when it is determined that the candidate LTE cell supports EN-DC, the end device may camp on the candidate LTE cell (block 725). In block 730, the end device may ignore handover to a non-EN-DC call. For example, subsequent to camping on an LTE cell that supports EN-DC, end device 180 may ignore an eCGI report request from core device 155 (e.g., MME 302), as previously described, in relation to a handover procedure or a cell selection/reselection procedure.

In block 720—NO, when it is determined that the candidate LTE cell does not support EN-DC, it is determined whether another candidate cell is available to consider (block 735). For example, end device 180 may continue to search or scan for additional candidate cells. When it is determined that there is another candidate cell to consider (block 735—YES), the process 700 may proceed to block 715. However, when it is determined that there is not another candidate cell to consider (block 735—NO), the end device may camp on the candidate cell (block 740). In block 745, subsequent to the camping on the non-EN-DC capable cell, end device may continue to search for a candidate cell that supports EN-DC.

Although FIG. 7 illustrates an exemplary process 700 of the cell selection management service, according to other embodiments, process 700 may include additional operations, fewer operations, and/or different operations than those illustrated in FIG. 7, and described herein.

Figure 8:
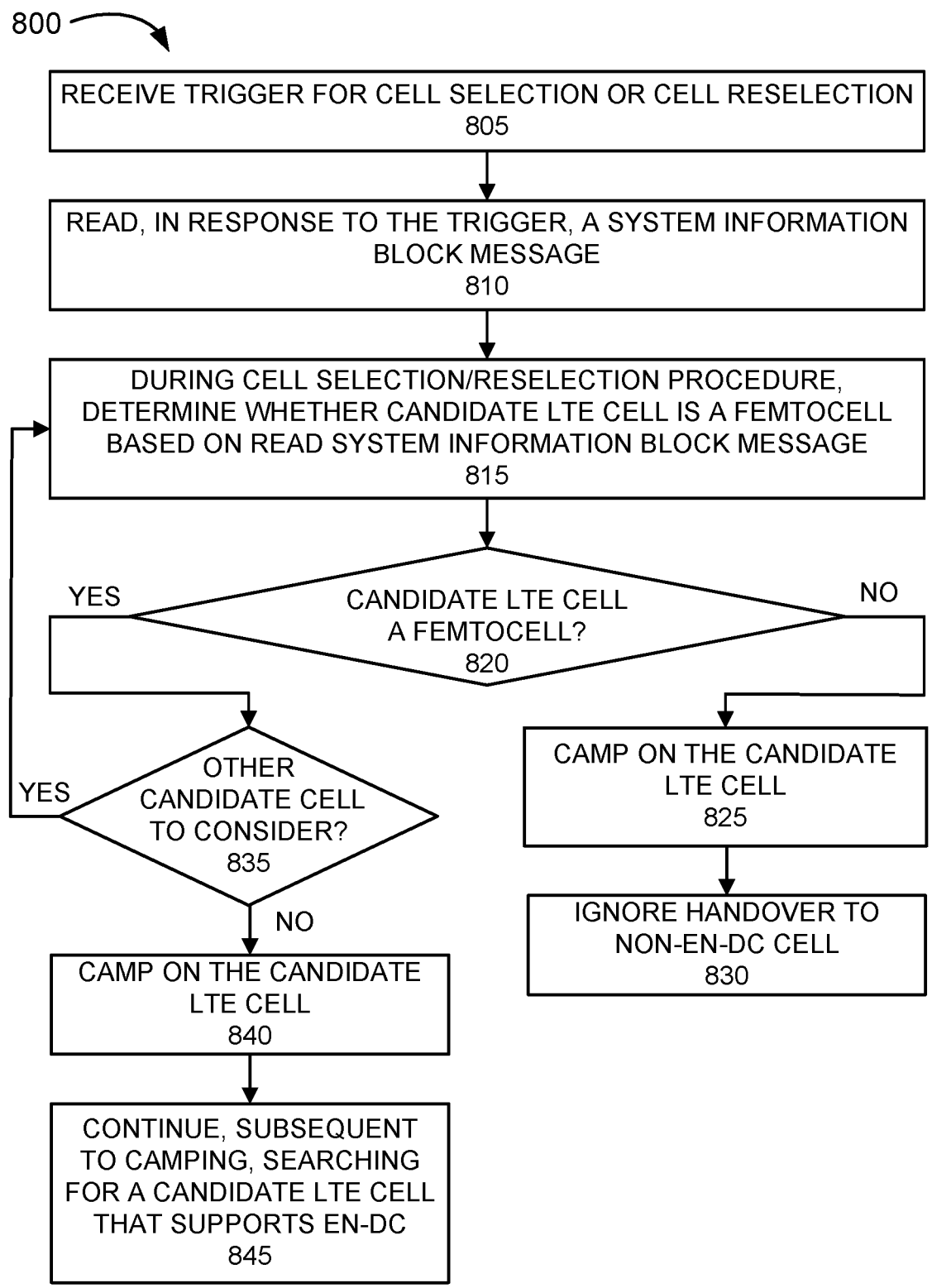

FIG. 8 is a flow diagram illustrating another exemplary process 800 of an exemplary embodiment of the cell selection management service. According to an exemplary embodiment, end device 180 performs steps of process 800. For example, processor 610 executes software 620 to perform a step illustrated in FIG. 8 and described herein. Additionally, or alternatively, a step illustrated in FIG. 8 may be performed by execution of only hardware.

In block 805, a trigger for cell selection or cell reselection may be received. In block 810, in response to the trigger, a SIB message may be read. For example, the SIB message may be a Type 1 message. The SIB message includes data that indicates whether the candidate cell is a femtocell (e.g., an LTE femtocell, a non-EN-DC capable femto cell, a 5G femtocell, etc.). For example, the SIB message may include an eCGI, a PCI, and/or CSG information. In block 815, during the cell selection/reselection procedure, it is determined whether a candidate cell is a femtocell based on the SIB message. In block 820—YES, when it is determined that the candidate cell is not a femtocell, the end device may camp on the candidate cell (block 825). For example, end device 180 may camp on an EN-DC capable LTE cell (e.g., eLTE eNB). In block 830, the end device may ignore handover to a non-EN-DC call. For example, subsequent to camping on an LTE cell that supports EN-DC, end device 180 may ignore an eCGI report request from core device 155 (e.g., MME 302), as previously described, in relation to a handover procedure or a cell selection/reselection procedure.

In block 820—NO, when it is determined that the candidate cell is a femtocell, it is determined whether another candidate cell is available to consider (block 835). For example, end device 180 may continue to search or scan for additional candidate cells. When it is determined that there is another candidate cell to consider (block 835—YES), the process 800 may proceed to block 815. However, when it is determined that there is not another candidate cell to consider (block 835—NO), the end device may camp on the candidate cell (block 840). In block 845, subsequent to the camping on the femtocell, end device may continue to search for a candidate cell that supports EN-DC or another network device (e.g., gNB) to use as an anchor node or on which to camp on.

Although FIG. 8 illustrates an exemplary process 800 of the cell selection management service, according to other embodiments, process 800 may include additional operations, fewer operations, and/or different operations than those illustrated in FIG. 8, and described herein.

Figure 9:
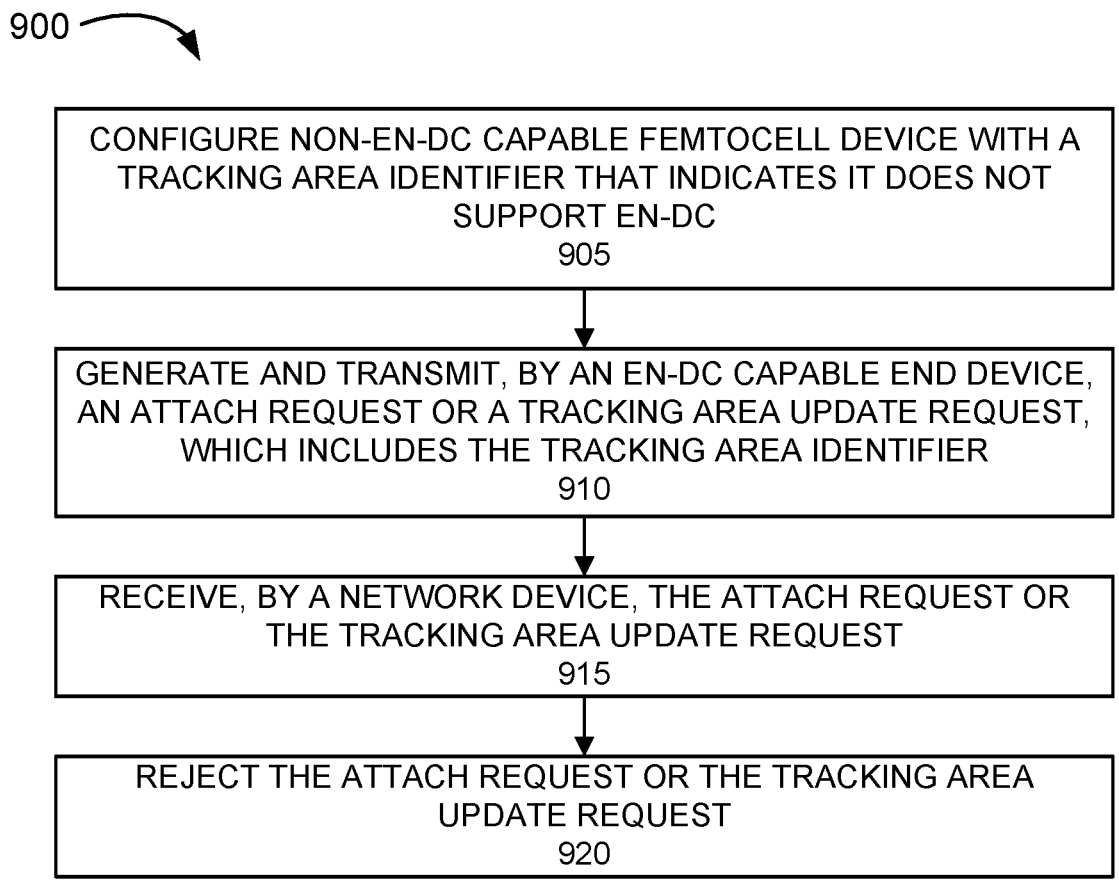

FIG. 9 is a flow diagram illustrating yet another exemplary process 900 of an exemplary embodiment of the cell selection management service. According to an exemplary embodiment, core device 155 (e.g., MME 302) and end device 180 perform steps of process 900. For example, processor 610 executes software 620 to perform a step illustrated in FIG. 9 and described herein. Additionally, or alternatively, a step illustrated in FIG. 9 may be performed by execution of only hardware.

In block 905, non-EN-DC capable femtocell devices may be configured with TA identifiers that indicate the femtocell is non-EN-DC capable. For example, MME 302 may store TA identifiers pertaining to non-EN-DC femtocells or another type of femtocell. In block 910, an attach request or a TAU request, which includes a TA identifier, may be generated and transmitted. For example, end device 180 may generate and transmit the request to MME 302. In block 915, the request is received. For example, MME 302 may receive the attach request or the TAU request from end device 180.

In block 920, the request is rejected. For example, MME 302 may compare the TA identifier included in the request with the stored TA identifiers, and determine that the cell is non-EN-DC capable. Additionally, MME 302 may determine that end device 180 is an EN-DC capable device (e.g., based on subscription data, IMSI, etc.), and that end device 180 is in an EN-DC service area, as previously described. MME 302 may generate and transmit a message (e.g., an EMM message that includes a cause code (e.g., code 12, code 15, etc.)), which rejects the request, to end device 180. In response to receiving the rejection, end device 180 may be triggered to find another cell on which to camp, attach, etc.

Although FIG. 9 illustrates an exemplary process 900 of the cell selection management service, according to other embodiments, process 900 may include additional operations, fewer operations, and/or different operations than those illustrated in FIG. 9, and described herein.

Figure 10:
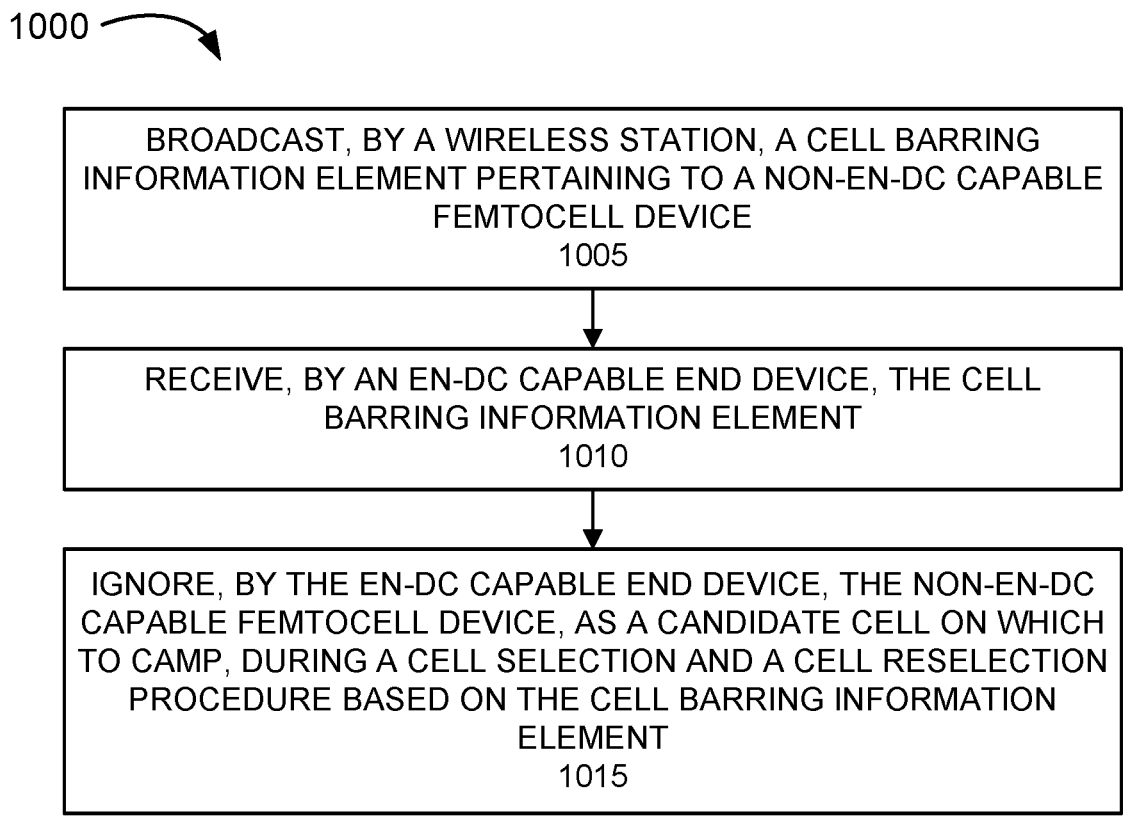

FIG. 10 is a flow diagram illustrating still another exemplary process 1000 of an exemplary embodiment of the cell selection management service. According to an exemplary embodiment, femtocell device 115 (or another type of wireless station that is not EN-DC capable, such as an eNB, etc.) and end device 180 performs steps of process 1000. For example, processor 610 executes software 620 to perform a step illustrated in FIG. 10, and described herein. Additionally, or alternatively, a step illustrated in FIG. 10 may be performed by execution of only hardware.

In block 1005, a wireless station may broadcast a cell barring information element pertaining to a non-EN-DC capable femtocell. For example, femtocell device 115 may broadcast a SIB Type 1 message that includes cell barring information element that indicates cell barring information for a femtocell. In block 1010, an end device may receive the cell barring information element. For example, end device 180 may receive and interpret the cell barring information. In block 1015, the end device may ignore a candidate cell identified during a cell selection or a cell reselection procedure based on the cell barring information. For example, end device 180 may use the cell barring information to avoid camping on a candidate cell that is identified in the cell barring information.

Although FIG. 10 illustrates an exemplary process 1000 of the cell selection management service, according to other embodiments, process 1000 may include additional operations, fewer operations, and/or different operations than those illustrated in FIG. 10, and described herein.

Figure 11:
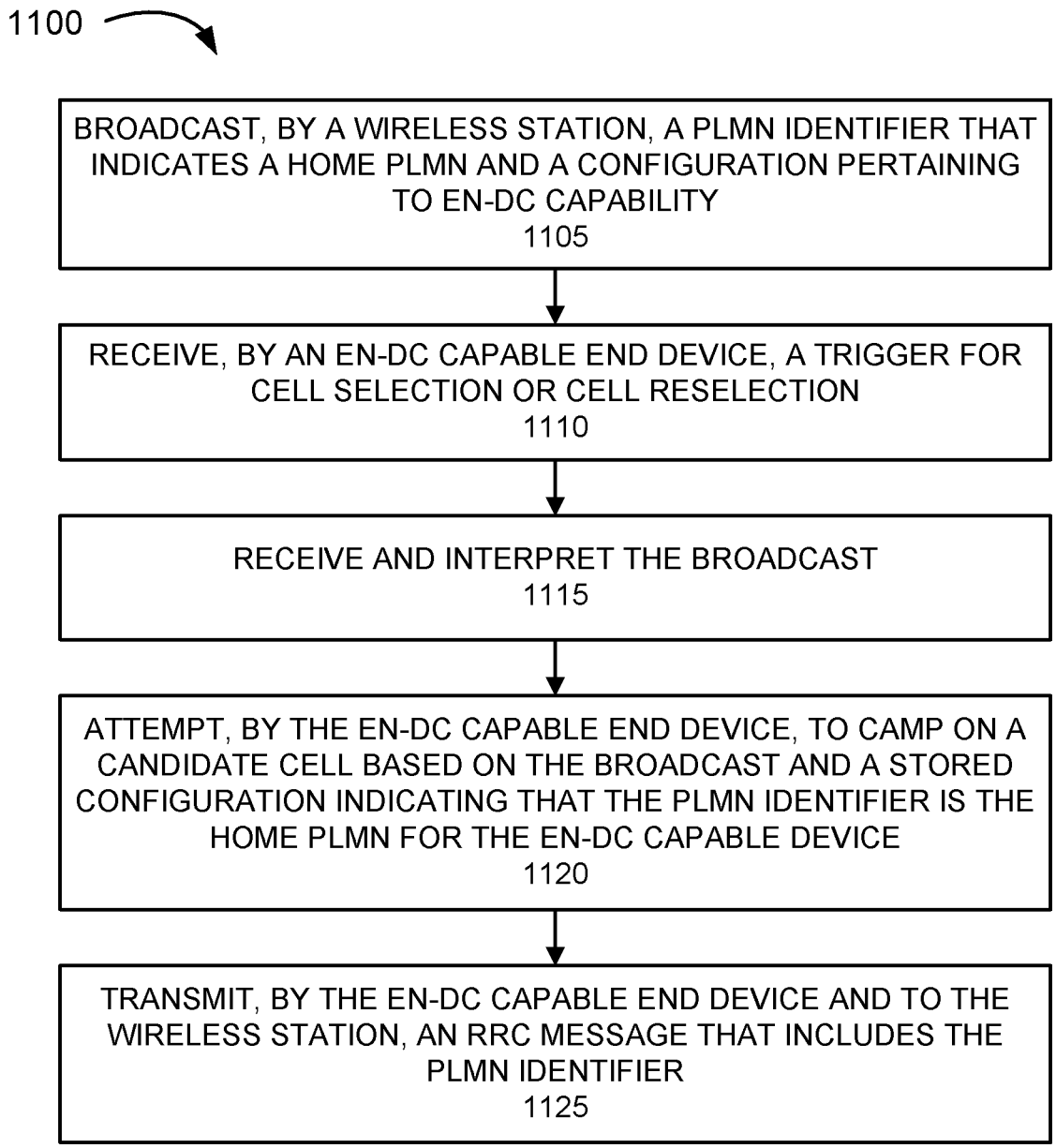

FIG. 11 is a flow diagram illustrating another exemplary process 1100 of an exemplary embodiment of the cell selection management service. According to an exemplary embodiment, master wireless station 110 (e.g., eLTE eNB 202) and end device 180 performs steps of process 1100. For example, processor 610 executes software 620 to perform a step illustrated in FIG. 11 and described herein. Additionally, or alternatively, a step illustrated in FIG. 11 may be performed by execution of only hardware.

In block 1105, a wireless station may broadcast a PLMN identifier that indicates a home PLMN for EN-DC capable end devices. For example, eLTE eNB 202 may broadcast a SIB Type 1 message that includes a home PLMN identifier that indicates a home PLMN for EN-DC capable end devices. As previously described, the SIB Type 1 message may also include another home PLMN identifier that indicates a home PLMN for end devices other than EN-DC capable end devices or different type of EN-DC device.

In block 1110, the end device may receive a trigger for cell selection or cell reselection. For example, end device 180 may receive a trigger to carry out a cell selection or a cell reselection procedure.

In block 1115, the end device may receive and interpret the broadcast. For example, end device 180 may receive and interpret the broadcasted SIB Type 1 message.

In block 1120, the end device may attempt to camp on a candidate cell based on the broadcast and configuration data indicating that the PLMN identifier is a home PLMN for the end device. For example, end device 180 may compare the PLMN identifier with configuration data stored by end device 180 (e.g., on a UICC, etc.). End device 180 may identify that the eLTE eNB 202 is part of the home PLMN.

In block 1125, the end device may transmit an RRC message, which includes the PLMN identifier, to the candidate cell device. For example, end device 180 may transmit an RRC message, which includes the PLMN identifier, to eLTE eNB 202.

Although FIG. 11 illustrates an exemplary process 1100 of the cell selection management service, according to other embodiments, process 1100 may include additional operations, fewer operations, and/or different operations than those illustrated in FIG. 11, and described herein.

FIG. 12 is a flow diagram illustrating another exemplary process 1200 of an exemplary embodiment of the cell selection management service. According to an exemplary embodiment, performs steps of process 1200. For example, processor 610 executes software 620 to perform a step illustrated in FIG. 12 and described herein. Additionally, or alternatively, a step illustrated in FIG. 12 may be performed by execution of only hardware.

In block 1205, an end device is configured with a TA forbidden list that includes a permanent TA forbidden list and a semi-permanent TA forbidden list. For example, end device 180 may store list 540, as previously described.

In block 1210, the end device may use the TA forbidden list to select a candidate cell on which to camp during a cell selection procedure or a cell reselection procedure. For example, end device 180 may identify whether a candidate cell is a femtocell or a non-EN-DC capable cell based on the TA identifier associated with a candidate cell and the permanent portion 550 of list 540.

In block 1215, the end device may update the permanent TA forbidden list. For example, end device 180 may update permanent portion 550 based on EMM reject messages, as previously described.

Although FIG. 12 illustrates an exemplary process 1200 of the cell selection management service, according to other embodiments, process 1200 may include additional operations, fewer operations, and/or different operations than those illustrated in FIG. 12, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to processes illustrated in FIGS. 7-12, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
performing, by an end device, a cell selection procedure or a cell reselection procedure, wherein the end device is an Evolved Universal Terrestrial Radio Access-New Radio (E-UTRA-NR) Dual Connectivity (EN-DC) capable device;
reading, by the end device, a first system information block (SIB) message broadcasted by a first wireless station, wherein the first SIB message indicates that the first wireless station is at least one of a femtocell device or a non-EN-DC capable anchor device;
determining, by the end device, whether the first wireless station identified during the cell selection procedure or the cell reselection procedure is an EN-DC capable anchor device based on the first SIB message, wherein the determining comprises:
comparing, by the end device, first data that is included in the first SIB message with second data that indicates that the first wireless station is not the EN-DC capable anchor device; and
determining, by the end device in response to a result of the comparing, that the first wireless station is not the EN-DC capable anchor device;
omitting to camp, by the end device in response to determining that the first wireless station is not the EN-DC capable anchor device, on the first wireless station; and
determining, by the end device in response to the omitting, whether a second candidate cell is available on which to camp.

2. The method of claim 1, wherein the first SIB message is a SIB Type 2 message that includes data or by omission of inclusion of data indicates that the first wireless station is the least one of the femtocell device or the non-EN-DC capable anchor device.

3. The method of claim 1, wherein the first SIB message is a SIB Type 1 message that includes at least one of an extended Cell Global Identifier pertaining to the first wireless station, a physical cell identity, a public land mobile network identifier, or a tracking area pertaining to the first wireless station.

4. The method of claim 1, wherein the first SIB message is a SIB Type 1 message that includes cell barring information pertaining to the first wireless station, wherein the cell barring information indicates that the first wireless station is barred as a Long Term Evolution anchor device for end devices that are EN-DC capable.

5. The method of claim 1, wherein the first SIB message is a SIB Type 1 message that includes closed subscriber group information pertaining to the first wireless station.

6. The method of claim 1, wherein the first wireless station is a Fourth Generation (4G) femtocell device.

7. The method of claim 1, further comprising:
camping, by the end device in response to determining that the second candidate cell is not available on which to camp, on the first wireless station.

8. The method of claim 1, further comprising:
determining, by the end device, that the second candidate cell is available to camp on, wherein the second candidate cell is an EN-DC capable anchor device; and
camping, by the end device, on the second candidate cell of a second wireless station.

9. An end device comprising:
a radio communication interface;
a memory, wherein the memory stores instructions; and
a processor, wherein the processor executes the instructions to:
perform a cell selection procedure or a cell reselection procedure, wherein the end device is an Evolved Universal Terrestrial Radio Access-New Radio (E-UTRA-NR) Dual Connectivity (EN-DC) capable device;
read a first system information block (SIB) message broadcasted by a first wireless station, wherein the first SIB message indicates that the first wireless station is at least one of a femtocell device or a non-EN-DC capable anchor device;
determine whether the first wireless station identified during the cell selection procedure or the cell reselection procedure is an EN-DC capable anchor device based on the first SIB message, wherein, when determining, the processor further executes the instructions to:
compare first data that is included in the first SIB message with second data that indicates that the first wireless station is not the EN-DC capable anchor device; and
determine, in response to a result of the comparison, that the first wireless station is not the EN-DC capable anchor device;
omit to camp, in response to a determination that the first wireless station is not the EN-DC capable anchor device, on the first wireless station; and
determine, in response to the omission to camp, whether a second candidate cell is available on which to camp.

10. The end device of claim 9, wherein the first SIB message is a SIB Type 2 message that includes data or by omission of inclusion of data indicates that the first wireless station is the least one of the femtocell device or the non-EN-DC capable anchor device.

11. The end device of claim 9, wherein the first SIB message is a SIB Type 1 message that includes at least one of an extended Cell Global Identifier pertaining to the first wireless station, a physical cell identity, a public land mobile network identifier, or a tracking area pertaining to the first wireless station.

12. The end device of claim 9, wherein the first SIB message is a SIB Type 1 message that includes cell barring information pertaining to the first wireless station, wherein the cell barring information indicates that the first wireless station is barred as a Long Term Evolution anchor device for end devices that are EN-DC capable.

13. The end device of claim 9, wherein the first SIB message is a SIB Type 1 message that includes closed subscriber group information pertaining to the first wireless station.

14. The end device of claim 9, wherein the first wireless station is a Fourth Generation (4G) femtocell device.

15. The end device of claim 9, wherein the processor further executes the instructions to:
camp, in response to a determination that the second candidate cell is not available on which to camp, on the first wireless station.

16. The end device of claim 9 wherein the processor further executes the instructions to:
determine that the second candidate cell is available to camp on, wherein the second candidate cell is an EN-DC capable anchor device; and
camp on the second candidate cell of a second wireless station.

17. A non-transitory computer-readable storage medium storing instructions executable by a processor of an end device, which when executed cause the end device to:
perform a cell selection procedure or a cell reselection procedure, wherein the end device is an Evolved Universal Terrestrial Radio Access-New Radio (E-UTRA-NR) Dual Connectivity (EN-DC) capable device;

read a first system information block (SIB) message broadcasted by a first wireless station, wherein the first SIB message indicates that the first wireless station is at least one of a femtocell device or a non-EN-DC capable anchor device;

determine whether the first wireless station identified during the cell selection procedure or the cell reselection procedure is an EN-DC capable anchor device based on the first SIB message, wherein the instructions to determine cause the end device to:

compare first data that is included in the first SIB message with second data that indicates that the first wireless station is not the EN-DC capable anchor device; and determine, in response to a result of the comparison, that the first wireless station is not the EN-DC capable anchor device;

omitting to camp, in response to a determination that the first wireless station is not the EN-DC capable anchor device, on the first wireless station; and determine, in response to the omission to camp, whether a second candidate cell is available on which to camp.

18. The non-transitory computer-readable storage medium of claim 17, wherein the first SIB message is a SIB Type 2 message that includes data or by omission of inclusion of data indicates that the first wireless station is the least one of the femtocell device or the non-EN-DC capable anchor device.

19. The non-transitory computer-readable storage medium of claim 17,
wherein the first SIB message is a SIB Type 1 message that includes at least one of an extended Cell Global Identifier pertaining to the first wireless station, a public land mobile network identifier, a physical cell identity, or a tracking area pertaining to the first wireless station.

20. The non-transitory computer-readable storage medium of claim 17, wherein the first SIB message is a SIB Type 1 message that includes cell barring information pertaining to the first wireless station, wherein the cell barring information indicates that the first wireless station is barred as a Long Term Evolution anchor device for end devices that are EN-DC capable.

\* \* \* \* \*